United States Patent
Dutta et al.

(10) Patent No.: US 11,880,413 B2
(45) Date of Patent: Jan. 23, 2024

(54) TRANSFORMING DATASETS FOR VISUALIZATION WITHIN WIDGETS ACROSS MULTIPLE PLATFORMS AND SOFTWARE APPLICATIONS

(71) Applicant: QUALTRICS, LLC, Provo, UT (US)

(72) Inventors: Ayushman Dutta, Seattle, WA (US); Chao Lai, Seattle, WA (US); David Seigle, Seattle, WA (US); Matthew Al-Sheikh, Seattle, WA (US); Owen Hancock, Seattle, WA (US); Myung Ryul Jang, Renton, WA (US)

(73) Assignee: Qualtrics, LLC, Provo, UT (US)

( * ) Notice: Subject to any disclaimer, the term of this patent is extended or adjusted under 35 U.S.C. 154(b) by 636 days.

(21) Appl. No.: 15/612,284

(22) Filed: Jun. 2, 2017

(65) Prior Publication Data
US 2018/0349516 A1 Dec. 6, 2018

(51) Int. Cl.
*G06F 16/00* (2019.01)
*G06F 16/904* (2019.01)
*G06F 3/0484* (2022.01)
*G06F 3/0481* (2022.01)
*H04N 1/00* (2006.01)

(52) U.S. Cl.
CPC .......... *G06F 16/904* (2019.01); *G06F 3/0481* (2013.01); *G06F 3/0484* (2013.01); *H04N 1/00501* (2013.01)

(58) Field of Classification Search
CPC ........ G06F 17/30994; G06F 17/30905; G06F 3/0484; G06F 3/0481; G06F 16/904; G06F 3/048; H04N 1/00501
See application file for complete search history.

(56) References Cited

U.S. PATENT DOCUMENTS

| 8,788,935 B1* | 7/2014 | Hirsch | G06F 8/10 |
| | | | 715/234 |
| 2003/0101284 A1* | 5/2003 | Cabrera | H04L 45/308 |
| | | | 719/313 |
| 2006/0036661 A1* | 2/2006 | Brennan | G06F 16/21 |
| 2008/0010344 A1* | 1/2008 | Wherry | G06F 17/30893 |
| | | | 709/204 |
| 2008/0040681 A1* | 2/2008 | Synstelien | G06F 9/451 |
| | | | 715/765 |

(Continued)

OTHER PUBLICATIONS

Collins, John, "Comparison of Relational and Multi Dimensional Database structures", Nov. 27, 2003, Techleader. Pro, 6 pages.*

*Primary Examiner* — Cesar B Paula
*Assistant Examiner* — David Faber
(74) *Attorney, Agent, or Firm* — Keller Preece PLLC

(57) ABSTRACT

This disclosure covers systems and methods that retrieve and transform a requested dataset into a data shape that a widget specifies for visualization. In certain embodiments, the disclosed systems and methods respond to data requests for widgets by retrieving datasets formatted according to different data models for different platforms. The systems and methods then transform the datasets into a data shape specified by the widgets. By transforming requested datasets to conform to data shapes specified by widgets, the disclosed systems and methods orchestrate the update of a widget (or multiple instances of a widget) with data that originally conformed to different data models and, in some cases, was formatted for different software applications.

20 Claims, 11 Drawing Sheets

(56) References Cited

U.S. PATENT DOCUMENTS

| | | | |
|---|---|---|---|
| 2010/0056127 A1* | 3/2010 | Osborne | G06F 17/30905 455/418 |
| 2010/0161713 A1* | 6/2010 | Gangadharappa | G06Q 10/10 709/203 |
| 2010/0235754 A1* | 9/2010 | Leitheiser | G06Q 30/0269 715/742 |
| 2011/0246618 A1* | 10/2011 | Howard | G06Q 30/0621 709/219 |
| 2017/0126843 A1* | 5/2017 | Pantea | G06F 3/1454 |
| 2018/0097913 A1* | 4/2018 | Smith | H04L 67/34 |

* cited by examiner

| View Model | Data Shape | Data-Shape Constraints | Additional Requirements | Software Application |
|---|---|---|---|---|
| Breakdown Bar | Data Cube | Dimensions: 1. metricProperties: [{ fixed: True, Type: Default, Hidden: true}] | Needs access to special data properties like weighting | Visualize |
| GaugeChart | Data Cube | Dimensions: 0 | Needs the domain of the field as well. | Visualize |
| Simple Table | Table | dimensionGroupCount: 2 dimensioGroupProperties: [{Label: 'Row' dimensions: 1 }, { Label: 'Column' | | Visualize |
| Pivot Table | Table | {dimensionGroup: 2, dimensionGroupProperties: [{ label: 'Row' Dimsensions:3 }, {label: 'Data Series' Optional: true }] | | Visualize |
| Gauge | Data Cube | Dimensions: 1 | | Reports |
| Pie Chart | Data Cube | Dimesion: 1 MetricProperties: [{ | | Reports |

Fig. 5

TRANSFORMING DATASETS FOR VISUALIZATION WITHIN WIDGETS ACROSS MULTIPLE PLATFORMS AND SOFTWARE APPLICATIONS

BACKGROUND

Computing devices often visualize data to present data to a user. A desktop or mobile computing device may, for example, execute a software component that visualizes data from various stock market indices, weather forecasts, or news headlines. Additionally, a desktop or mobile computing device may execute a web browser with an embedded plugin that visualizes the results of a digital survey as a table, chart, or other graphic representation. Regardless of the context, computing devices often visualize data for presentation to a user through software components.

Conventional data visualization systems, however, often use plugins and other software components that operate exclusively with a single platform. In such cases, conventional data visualization systems may employ customized software components that solely recognize data conforming to a data model associated with a single platform. For example, certain software components for a conventional survey-results visualization system may be configured to exclusively receive data from a digital survey system's server that uses a specific data model and a specific software language. Similarly, a conventional weather-forecast visualization system may be configured to exclusively receive data from a weather system's server that uses a different specific data model and a different specific software language. Consequently, conventional data visualization systems may use software components that fail to recognize data from different platforms organized in a different data model or software language. Accordingly, conventional data visualization software components are often not compatible across multiple platforms.

Similarly, conventional data visualization systems often use software components that operate exclusively within the context of a particular software application. For example, a web browser may execute a plugin to render a visualization of an updated dataset. But conventional data visualization systems, the plugin is often configured specifically for the web browser and thus may not operate in a context outside of the web browser. Similarly, a word processor may embed an applet within a document to visualize updated data. But the embedded applet may likewise cease to function in a context outside of the word processor. As suggested by these examples, conventional data visualization systems often rely on software components that are not compatible with multiple software applications.

Regardless of whether data visualization systems operate only with certain software applications, many software components used by conventional data visualization systems update data only upon receiving an indication of a user-driven event. Many such software components, for example, request and receive updated data when a user causes a computing device to initiate a software application, but otherwise maintain outdated data. As another example, by convention, many software components used in conventional data visualization systems request and receive updated data only when an underlying operating system receives a notification that the user has selected to access the data visualization. But this event-driven-update process often leads to multiple software components simultaneously requesting updated data and slowing down the computing device from processing the requested data.

Accordingly, conventional data visualization systems often use customized software components that operate and update data in limited and specific environments that depend on particular platforms, software applications, and/or user-driven events.

SUMMARY

This disclosure describes solutions to some or all the foregoing problems with systems, non-transitory computer readable storage media, and methods that retrieve and transform a requested dataset into a data shape that a widget specifies for visualization. In some embodiments, the disclosed systems, non-transitory computer readable storage media, and methods respond to data requests for widgets by retrieving datasets formatted according to different data models for different platforms. The systems, non-transitory computer readable storage media, and methods then transform the datasets into a data shape specified by the widgets. By transforming requested datasets to conform to data shapes specified by widgets, the disclosed systems, non-transitory computer readable storage media, and methods orchestrate the update of a widget (or multiple instances of a widget) with data that originally conformed to different data models and, in some cases, was formatted for different software applications.

For instance, in some embodiments, the systems, non-transitory computer readable storage media, and methods receive a data request from a client device comprising a widget, where the widget specifies a data shape and corresponding data-shape constraints for the data request. Based on the data request, the disclosed systems, non-transitory computer readable storage media, and methods retrieve a dataset having a data structure corresponding to a data model. In some cases, the data model is associated with a particular platform. Rather than transmit the dataset in its current data structure, the systems, non-transitory computer readable storage media, and methods transform the dataset from the data structure to conform to the data shape and the corresponding data-shape constraints specified by the widget. After transformation, the systems, non-transitory computer readable storage media, and methods provide the dataset to the client device for visualization within the widget.

Similarly, in some embodiments, the systems and methods receive from a single client device data requests that include a data shape and corresponding data-shape constraints specified by multiple instances of the same widget. In some such embodiments, for example, the data requests call for datasets that have different data structures corresponding to different data models that are in turn associated with different platforms. Despite these different data structures, data models, and platforms, the disclosed systems and methods transform the datasets into the specified data shape. Relatedly, in some cases, the multiple instances of the widget respectively interface with different software applications, but nevertheless visualize datasets that the systems and methods transform into a specified data shape for the multiple instances of the widget.

By transforming datasets from a data structure associated with a particular platform into a data shape specified by a widget, the disclosed methods and systems facilitate updating datasets for a widget independent of a particular platform. Apart from platform independence, the disclosed systems and methods' transformation enables updating data for visualization within a widget that interfaces with multiple software applications. In other words, in some embodiments, the systems and methods package and deliver data to widgets in data shapes that enable the widgets to operate and visualize data independent of the software application with which it interfaces.

The following description sets forth additional features and advantages of one or more embodiments of the disclosed systems and methods. In some cases, such features and advantages will be obvious to a skilled artisan from the description or may be learned by the practice of the disclosed embodiments.

BRIEF DESCRIPTION OF THE DRAWINGS

The detailed description refers to the drawings briefly described below.

FIG. 5 illustrates a database in accordance with one or more embodiments.

DETAILED DESCRIPTION

Figure 1:
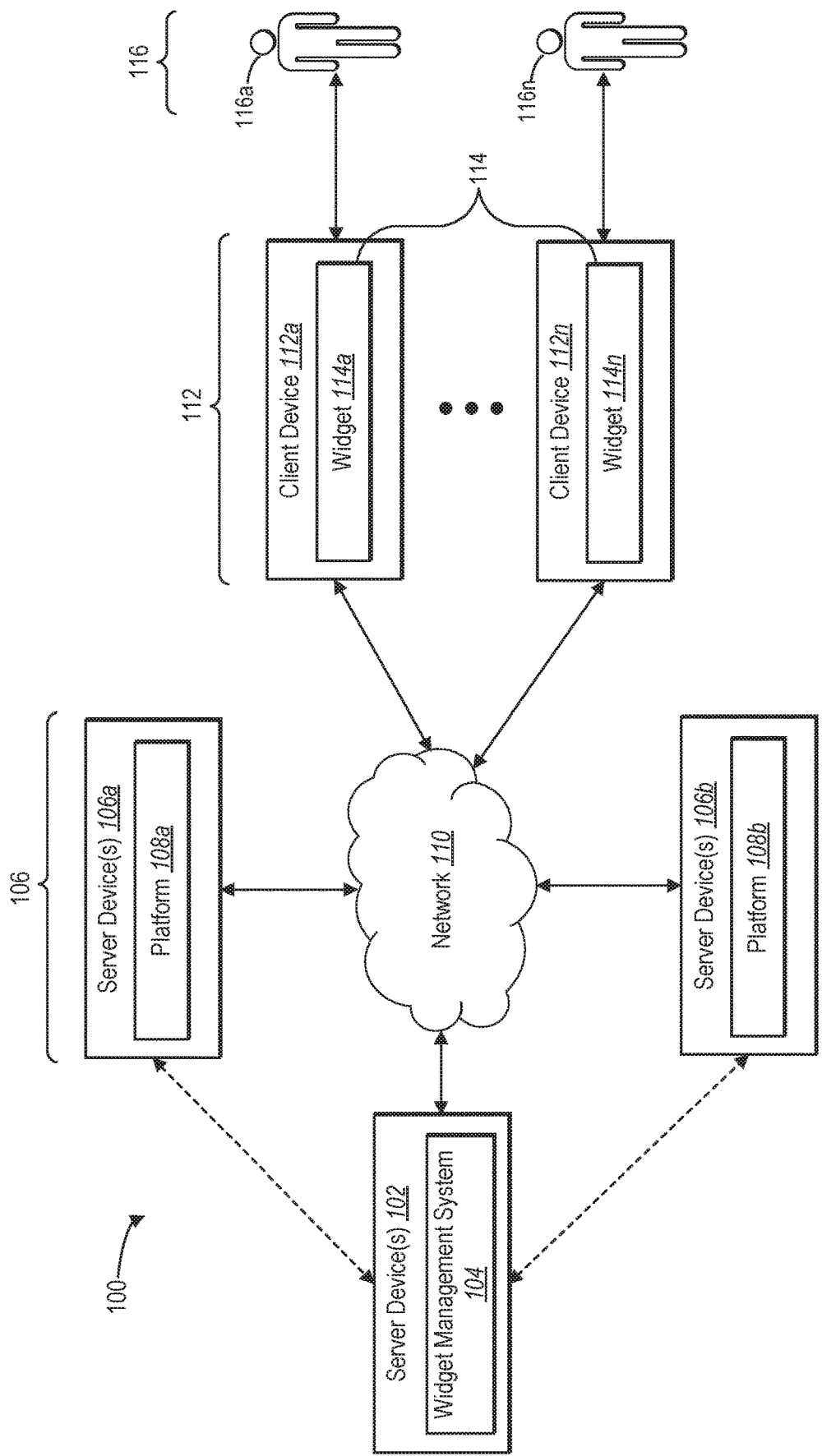
FIG. 1 illustrates a block diagram of an environment for implementing a widget management system in accordance with one or more embodiments.

This disclosure describes one or more embodiments of a widget management system that retrieves and transforms a requested dataset into a data shape that a widget specifies for visualization. In some embodiments, the widget management system responds to data requests for widgets by retrieving datasets formatted according to different data models for different platforms. The widget management system then transforms the datasets into a data shape specified by the widgets. By transforming requested datasets to conform to data shapes specified by widgets, the widget management system orchestrates the update of a widget (or multiple instances of a widget) with data that originally conformed to different data models and, in some cases, was formatted for different software applications.

For instance, in some embodiments, the widget management system receives a data request from a client device comprising a widget, where the widget specifies a data shape and corresponding data-shape constraints for the data request. Based on the data request, the widget management system retrieves a dataset having a data structure corresponding to a data model, such as a data model associated with a particular platform. Rather than transmit the dataset in the particular platform's data structure, the widget management system transforms the data structure of the dataset to conform to the data shape and the corresponding data-shape constraints specified by the widget. After transformation, the widget management system provides the dataset to the client device for visualization within the widget.

Similarly, in some embodiments, the widget management system receives from a single client device multiple data requests that include a data shape and corresponding data-shape constraints specified by multiple instances of the same widget. In some such embodiments, for example, the data requests call for datasets that have different data structures corresponding to different data models associated with different platforms. Despite having different data structures, data models, and platforms, the disclosed widget management system transforms each of the datasets into the specified data shape to allow each of the multiple instances of the widget to visualize the dataset regardless of a particular platform or context within which a particular instance of a widget operates.

In some embodiments, the widget management system supports a widget that is compatible across multiple software applications operating in different contexts. For example, the widget management system enables a user to integrate a first instance of a widget and a second instance of the widget respectively within a first software application and a second software application. A client device can initialize the first and second instances of the widget, either concurrently or separately. In response, the client device sends a first data request and a second data request that call for a data shape and corresponding data-shape constraints specified by both instances of the widget. After sending the data requests, the client device receives a first dataset and a second dataset that conform to the data shape and the corresponding data-shape constraints, and visualizes the first dataset within the first instance of the widget interfacing with the first software application and the second dataset within the second instance of the widget interfacing with the second software application. Accordingly, the widget management system enables a user to easily and efficiently integrate a widget to visualize data across various contexts (e.g., different software applications).

In addition to providing widgets that specify data shapes, in some embodiments, the widget management system provides widgets encoded to repeat a cycle of data requests. While some conventional data visualization systems send data requests in response to user-driven events, in some embodiments, the widget management system optionally provides a widget that causes a client device to periodically transmit data requests at routine intervals. These periodic requests avoid simultaneous data requests from multiple widgets (e.g., upon initializing a web page that includes multiple widgets) that can slow down and inhibit conventional data visualization systems from updating data for visualization within a widget. Accordingly, the widget management system can improve the performance of computing devices by decreasing processor load and communication bandwidth load while updating data within a widget.

In addition to updating widgets with cyclic data requests, in some embodiments, the widget management system provides a widget that compacts data requests. In contrast to many conventional data visualization systems that exchange multiple sets of information before requesting a dataset, in some embodiments, the widget management system provides a widget that causes a client device to compact multiple components of a data handshake into a single data request. For example, in some embodiments of the widget management system, a widget optionally causes a client device to send a data packet that comprises authentication information that complies with an authentication protocol, an identification of a user, a request for a dataset, and a specification of a data shape and corresponding data-shape constraints. This compacted data request streamlines the data handshake between a client device and a server by eliminating the exchange of multiple sets of information before the server retrieves the requested dataset.

Beyond providing a widget with a compact data request, the widget management system also exchanges and transforms data in ways that result in an easy-to-use and cross-compatible widget, unlike the customized software components of conventional data visualization systems. By transforming datasets from a data structure associated with a particular platform into a data shape specified by a widget, the widget management system facilitates updating datasets for a widget independent of a particular platform. Apart from platform independence, the widget management system's transformation of data enables a computing device to update data for visualization within a widget that a user can integrate within multiple software applications. In other words, in some embodiments, the widget management system packages and delivers data to widgets in data shapes that enable the widgets to operate and visualize data independent of the software application with which it interfaces.

For explanatory purposes, this disclosure uses several terms with the following definitions. As used in this disclosure, the term "widget" refers to a software component that visualizes data. In some embodiments, a widget visualizes data as the data changes over time. As described below, widgets come in a variety of formats. For example, a widget may be a desktop widget that a desktop computer's operating system executes and that visualizes data for news stories, calendars, survey results, time, weather forecasts, or any other category of information. Similarly, a widget may be a mobile widget that a mobile device's operating system executes and that visualizes data representing the same or similar information categories as a desktop widget, such as maps, sports scores, or stock market indices. Conversely, a widget may be a web widget embedded within code for a web page that visualizes any category of information, such as survey results, advertisements, or news headlines. In addition, widgets can be integrated within various other types of software applications, such as document creation applications, presentation applications, spreadsheet applications, and the like.

Relatedly, the term "platform" refers to a technological environment for which software components and applications are developed and within which computing devices operate software components and applications. For example, a platform may include server devices that execute a specific software language or machine language code and also run a type of software or suite of compatible software applications. A platform may likewise use a data model that is specific to the platform and that specifies data formats for storing, sending, and receiving data. Accordingly, one platform's data model may differ from and be incompatible with another platform's data model.

The term "data model" refers to a model for organizing elements of data and defining how one portion of data relates to another portion of data. For example, in some contexts, a data model includes logical rules that define how computing devices store data and how data interact with each other, such as through relational databases. A data model may include specific types of databases and data structures that are compatible with each other. Moreover, a data model may also include specific entity types, attributes, relationships, integrity rules, and definitions of data objects.

Conversely, the term "data shape" refers to a data structure specified by a widget. A data shape may include, but is not limited to, a data cube, such as an Online Analytical Processing ("OLAP") cube; a table, such as a relational table; or any data structure for a multi-dimensional dataset. A data shape may also include one or more data-shape constraints. Indeed, a single data shape may have several different data-shape constraints for several different varieties of a particular data shape. The term "data structure" refers to a format for organizing data. For example, a data structure may include a bit array, a matrix, a binary tree, or any other commonly known, generic, or customized data structure. In some cases, a particular platform's data model may use a customized data structure. As suggested above, a platform's data model may define a customized data structure that is incompatible with another platform's data model.

A "data-shape constraint" refers to a specific dimension or property for a data shape. For example, a data-shape constraint for a relational table may include two dimensions—with one dimension corresponding to one row and another dimension corresponding to one column. As another example, a data-shape constraint for a data cube may include three dimensions—with a first dimension corresponding to one row, a second dimension corresponding to one column, and a third dimension corresponding to a table for different categories with a column and row for each category. Relatedly, a data-shape constraint may include a property for labels or filters, such as a label of a row for a dimension or a filter of a time series for all dimensions.

Figure 2:
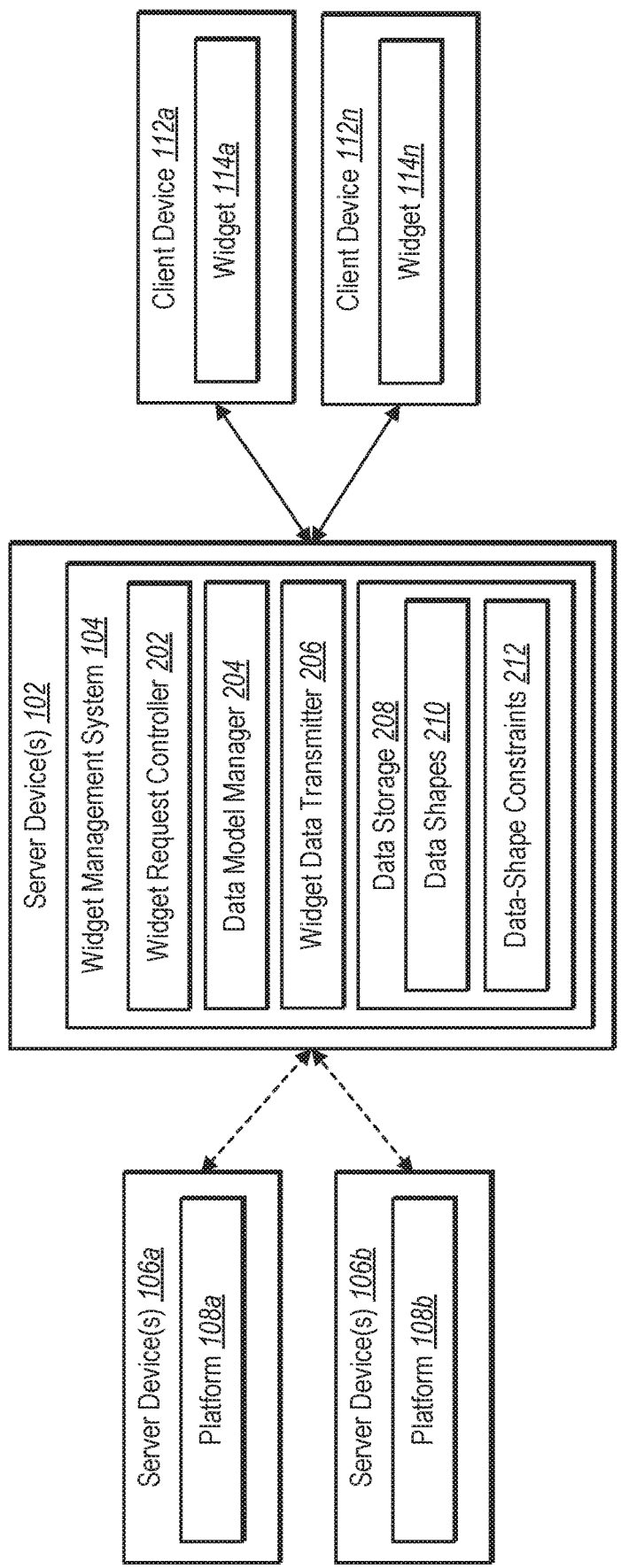
FIG. 2 illustrates a schematic diagram of the widget management system of FIG. 1 in accordance with one or more embodiments.

Turning now to the figures, FIGS. 1 and 2 provide an overview of an environment in which a widget management system can operate and an example architecture with accompanying functions for the widget management system. After providing an overview of the environment and architecture for a widget management system, this disclosure describes additional embodiments of the widget management system with reference to FIGS. 3-7.

FIG. 1 is a block diagram illustrating an environment 100 in which a widget management system 104 can operate in accordance with one or more embodiments. As illustrated in FIG. 1, the environment 100 includes server device(s) 102 that comprise the widget management system 104; server device(s) 106a and 106b that respectively comprise platforms 108a and 108b; client devices 112a and 112n that respectively comprise widgets 114a and 114n; users 116a and 116n respectively associated with the client devices 112a and 112n; and a network 110, such as the Internet. The server device(s) 106a and 106b (collectively referred to as "server device(s) 106") may belong to the same party or organization as the server device(s) 102 or belong to a third party that differs from the party or organization that operates the server device(s) 102.

As further illustrated in FIG. 1, both the server device(s) 102 and the client devices 112a and 112n (collectively referred to as "client devices 112") communicate through the network 110 with the server device(s) 106. In some embodiments, the client devices 112 communicate indirectly with the server device(s) 106 through the server device(s) 102, which include the widget management system 104. Accordingly, in some embodiments, the server device(s) 102 and the widget management system 104 act as an intermediary between the client devices 112 and the server device(s) 106. For example, the server device(s) 102 may receive data requests for data specified by the widgets 114a and 114n (collectively referred to as "widgets 114") from the client devices 112. The server device(s) 102 may then retrieve and transform datasets responsive to the data requests for visualization with the widgets 114.

As described below, the server device(s) 102 enable various functions, features, processes, methods, and systems described herein using, for example, the widget management system 104. Additionally, or alternatively, the server device(s) 102 coordinate with the server device(s) 106 and the client devices 112 to perform or provide the various functions, features, processes, methods, and systems described below. Although FIG. 1 illustrates an arrangement of the server device(s) 102, server device(s) 106, client devices 112, and network 110, various additional arrangements are possible. For example, the server device(s) 102 may directly communicate with the server device(s) 106 and thereby bypass the network 110. FIGS. 1 and 2 represent the possibility that the server device(s) 102 directly communicate with the server device(s) 106 (and vice versa) with arrows. Moreover, while FIG. 1 illustrates two users 116a and 116n (collectively referred to as "users 116") associated with the two client devices 112, in alternative embodiments, the environment 100 includes fewer or more users and client devices. For example, in alternative embodiments, the environment 100 includes hundreds, thousands, millions, or more users and associated client devices.

As further shown in FIG. 1, the users 116 interact with client devices 112 to access data, documents, software applications, or software components corresponding to the widgets 114, which are provided (in whole or in part) by the server device(s) 102 and the server device(s) 106. For example, the users 116 may interact with the client devices 112 to request a data package from the server device(s) 102 or, alternatively, from the server device(s) 106. Specifically, the client devices 112 may request a data package that includes instructions, that when executed by the client devices 112, create or otherwise integrate each of the widgets 114 within an application, webpage, operating system, etc. In addition, based on creating the widget, the client devices 112 can further request datasets to update visualizations within the widgets 114.

As mentioned, in some embodiments, the server device(s) 102 provide instructions (e.g., executable code) to the client devices 112 that, when executed, cause the client devices 112 to create or otherwise integrate each of the widgets 114 into a document, web page, application, operating system, or another context as described herein. In some such embodiments, the instructions sent from the server device(s) 102 or the server device(s) 106 define one or both of a data shape and corresponding data-shape constraints for datasets to be visualized by the widgets 114. In other words, the instructions, when executed by the client devices 112, create the widgets 114 that request and accept datasets with defined data shapes and corresponding data-shape constraints.

The instructions sent from the server device(s) 102 may likewise include visualization settings corresponding to the widgets 114 that enable the users 116 to change visualization properties within the widgets 114. In some cases, when the users 116 change the visualization settings, the visualization settings change the data-shape constraints specified by a widget so that the widget sends a data request to obtain data having data-shape constraints that are consistent with the updated visualization settings. Relatedly, in some embodiments, the server device(s) 102 relay datasets to the client devices 112 from the server device(s) 106 to enable the widgets 114 to update information and visualize datasets with information concerning news stories, calendars, survey results, or any other category of information.

As further shown in FIG. 1, the widget management system 104 accesses, manages, analyzes, and queries data corresponding to some or all of the widgets 114, including datasets corresponding to data requests for the widgets 114. For example, in some embodiments, the widget management system 104 receives—through the server device(s) 102—a data request from the client device 112a and a data request from the client device 112n. Both of these data requests may, for example, call for a data shape and corresponding data-shape constraints specified by the widget 114a and the widget 114n. In the alternative, these data requests may call for the same or different data shapes and/or the same or different corresponding data-shape constraints.

Based on receiving the data requests, the widget management system 104 causes the server device(s) 102 to retrieve datasets from the server device(s) 106a and 106b. In some embodiments, the retrieved datasets have data structures that correspond to a particular data model for the platforms 108a and 108b. For example, the dataset requested from the server device(s) 106a may be formatted in a data structure that conforms to a particular data model for the platform 108a. Conversely, the dataset requested from the server device(s) 106b may be formatted in a different data structure that conforms to a different data model for the platform 108b.

In some such embodiments, the datasets requested from the server device(s) 106 are both formatted in data structures that are incompatible with the widgets 114. In other words, one or more of the widgets 114 do not recognize data (e.g., cannot visualize data) within the data structures associated with the platform 108a or 108b. To make the requested datasets compatible with the widgets 114, the widget management system 104 causes the server device(s) 102 to transform the datasets from their respective data structures to the data shapes and corresponding data-shape constraints specified by the widgets 114 in the data requests. The widget management system 104 then sends the transformed datasets to the client devices 112 for visualization within the widgets 114.

Within the arrangement shown in FIG. 1, the client devices 112 can include various types of client devices. For example, the client devices 112 can be mobile devices, tablets, laptop computers, desktop computers, smart televisions, televisions, monitors, or any other type of computing device, as further explained below with reference to FIG. 8. Additionally, the server device(s) 102 and 106 can include one or more computing devices, including those explained below with reference to FIG. 8. Similarly, the server device(s) 102 and 106 and the client devices 112 may communicate using any communication platforms and technologies suitable for transporting data and/or communication signals, including any known communication technologies, devices, media, and protocols supportive of data communications, examples of which are described with reference to FIG. 9.

While both FIGS. 1 and 2 illustrate the server device(s) 102 as comprising the widget management system 104, in other embodiments, the client devices 112 comprise the widget management system 104 or portions of the widget management system 104. In particular, in some instances, the client devices 112a and 112n respectively use the widgets 114a and 114n to perform the functions described above and below by the widget management system 104. In other words, in some embodiments, the client devices 112 each comprise a widget management system. Additionally, in some embodiments, the same server device(s) include both the widget management system 104 and the platforms 108a and 108b, such as the server device(s) 102 include the widget management system 104 and the platforms 108a and 108b.

Turning now to FIG. 2, this figure illustrates a schematic diagram of one embodiment of the server device(s) 102. As shown, the server device(s) 102 are communicatively coupled to both the server device(s) 106 and the client devices 112. As indicated by FIG. 1, this coupling between the server device(s) 102, on the one hand, and the server device(s) 106 and the client devices 112, on the other hand, may be through the network 110. As shown in FIG. 2, the widget management system 104 includes, but is not limited to, a widget request controller 202, a data model manager 204, a widget data transmitter 206, and a data storage 208. The following paragraphs describe each component of the widget management system 104 in turn.

As suggested by its name, the widget request controller 202 receives and processes widget initiated data requests from the client devices 112 by retrieving datasets that widgets 114 specify in the data requests. Some such data requests call for datasets that the server device(s) 106 maintain or, alternatively, datasets that the server device(s) 102 maintain. Accordingly, in some instances, the data requests may call for datasets from an organization that provided one of the widgets 114 or for datasets from an organization that did not provide one of the widgets 114.

Data requests may likewise call for datasets of specific data shapes and specific corresponding data-shape constraints—regardless of the requested dataset's data structure or corresponding data model of the platforms 108a and 108b. For example, a data request can specify a dataset having a data shape defined by a multi-dimensional array of values. Alternatively, a data request can specify a dataset having a data shape defined a single dimension of values.

For example, the widget 114a can specify a data request to include a request for a dataset with a data shape having a format of a data cube with three dimensions for a row, column, and an additional category. Additionally, the widget 114n can specify a data request to include a request for a dataset with a data shape having a format of a referential table with two dimensions for a row and column. As noted above, the data cube and referential table are examples of data shapes and the dimensions for rows, columns, and an additional category are examples of data-shape constraints. Alternatively, the widget request controller 202 may receive data requests from the client devices 112 that both call for datasets formatted in a same data shape and corresponding data-shape constraints, such as multiple data requests that specify a data cube with three dimensions.

In addition to calling for specific data shapes and corresponding data-shape constraints, in some embodiments, the widget management system 104 is reverse compatible with a variety of standard widgets by using the widget request controller 202 to receive data requests that lack data-shape specifications. A "standard version" of a widget is a conventional, legacy, or older version of a widget. A standard version of a widget may, for example, not yet (or never) have the capability of specifying data shapes or corresponding data-shape constraints. Some standard version widgets are compatible with a legacy platform that a firm may not plan on updating. Additionally, some standard version widgets use conventionally technology that a designer does not plan on updating to call for data shapes or corresponding data-shape constraints.

Turning back to FIG. 2, the widget request controller 202 optionally receives data requests from a client device that calls for neither data shape nor corresponding data-shape constraints. In some such embodiments, the widget specifies the dataset requested by the data requests, but without data shape or corresponding data-shape constraints. Such a data request may nevertheless be directed to either the server device(s) 102 or the server device(s) 106. As explained below, upon receiving a data request calling for neither data shape nor corresponding data-shape constraints, the widget management system 104 simply retrieves a dataset having a data structure that corresponds to a data model for the widget's platform and then provides the datasets to the requesting client device for visualization within the widget.

Regardless of whether a data request calls for data shapes or corresponding data-shape constraints, in some embodiments, the widget request controller 202 receives cyclic data requests. For example, in some embodiments, the widget request controller 202 receives periodic widget-initiated data requests from a single client device at reoccurring intervals. In some such embodiments, the data requests call for data shapes and corresponding data-shape constraints specified by one of the widgets 114. Alternatively, in some embodiments, the widget request controller 202 receives data requests that are triggered by a user event, such as when a one of the client devices 112 initiates one of the widgets 114 or when an underlying operating system on one of the client devices 112 receives a notification that one of the users 116 has selected to access one of the widgets 114.

In addition to cyclic data requests, in some embodiments, the widget request controller 202 receives compact data requests. The widget request controller 202 may optionally use a conventional call-and-response with the client devices 112 to authenticate and identify one of the client devices 112 or users 116 before retrieving the requested data. In some embodiments, however, the widget request controller 202 receives a data packet that includes one or more of authentication information that complies with an authentication protocol, an identification of one of the users 116, a request for a dataset, and a specification of a data shape and corresponding data-shape constraints. The authentication information may, for example, comply with an authentication protocol for the server device(s) 102 and/or the server device(s) 106. Additionally, the identification of one of the users 116 may include an identification of one of the client devices 112 or an identification by credentials for an account of one of the users 116 (e.g., a username and password).

As noted above, in addition to receiving data requests, the widget request controller 202 retrieves datasets based on the data requests. For example, the widget request controller 202 may cause the server device(s) 102 to send a data request to one of the server device(s) 106 for a specific dataset. In such embodiments, the widget request controller 202 sends the data request to one of the server device(s) 106 with or without the specification for a data shape or corresponding data-shape constraints. In response to relaying the data request to the server device(s) 106, the server device(s) 102 can receive the requested dataset from the server device(s) 106. As another example, the widget request controller 202 optionally identifies the requested dataset within the server device(s) 102. Regardless of how a dataset is retrieved or identified, once the widget request controller 202 retrieves or otherwise identifies the requested dataset, the widget request controller 202 provides the dataset to the data model manager 204.

As just noted, in addition to the widget request controller 202, the widget management system 104 further comprises the data model manager 204. The data model manager 204 transforms the native data structure of a dataset to conform to a data shape and corresponding data-shape constraints specified by a widget. As mentioned above, in some embodiments, the widget request controller 202 retrieves datasets having data structures that correspond to a particular platform's data model. In some such cases, the dataset's data structure is incompatible with data structures and formats recognized by a widget or otherwise different from a data shape or corresponding data-shape constraints specified by a widget. To eliminate this data structure incompatibility, the data model manager 204 transforms datasets from their native data structures to conform to a data shape and corresponding data-shape constraints specified by a widget in a data request.

For example, in some embodiments, the data model manager 204 analyzes a dataset to identify a data structure for the dataset (e.g., a data structure based on the data model of the platform 108a). The data model manager 204 further analyzes the dataset to determine that the data structure differs from a data shape and corresponding data-shape constraints specified by the widget 114a. In some embodiments, the data model manager 204 extracts or isolates the dataset from the data structure and reformats the dataset into the data shape and corresponding data-shape constraints specified by the widget 114a.

As another example, based on a data request initiated by widget 114n, the data model manager 204 may perform the same process described above to an additional dataset having an additional data structure corresponding to a data model of the platform 108b. By analyzing, extracting or isolating, and reformatting the additional dataset, the data model manager 204 transforms the additional dataset from the additional data structure to conform to an additional data shape and additional data-shape constraints specified by the widget 114n. In some embodiments, the data model manager 204 repeats this process for any number of datasets having any number of data structures. Moreover, the data shapes and corresponding data-shape constraints to which the data model manager 204 conforms the datasets may be the same or different—as specified by one or more of the widgets 114.

Alternatively, in certain embodiments, the data model manager 204 does not transform a requested dataset from a data structure to a specified data shape and corresponding data-shape constraints. In embodiments where the widget request controller 202 receives a data request calling for neither data shape nor corresponding data-shape constraints, the data model manager 204 does not transform the requested dataset, but passes the requested dataset to the widget data transmitter 206 for transmission to one of the client devices 112.

In addition to transforming datasets, the widget management system 104 also provides transformed datasets to the client devices that requested the datasets. As shown in FIG. 2, the widget data transmitter 206 causes the server device(s) 102 to transmit transformed datasets from the server device(s) 102 to the client devices 112. The widget data transmitter 206 causes the server device(s) 102 to transmit such datasets to the client devices 112 for visualization within the widgets 114 on the client devices 112.

For example, the widget data transmitter 206 may cause the server device(s) 102 to transmit a dataset transformed by the data model manager 204 to the client device 112a based on the widget 114a initiating a data request from the client device 112a. Additionally, in some embodiments, the widget data transmitter 206 causes the server device(s) 102 to transmit a transformed dataset as a data stream to a client device, such as a data stream representing audio, an audio clip, or looped audio, or a data stream representing a video, video clip, or looped video. Similarly, the widget data transmitter 206 may cause the server device(s) 102 to transmit transformed datasets as data streams to the client device 112a and the client device 112n to cause the widget 114a and widget 114n to visualize the data in the respective data streams.

Alternatively, based on receiving a data request that calls for neither data shape nor corresponding data-shape constraints, the widget data transmitter 206 transmits a dataset to the requesting client device—without transforming a data structure to conform to a data shape or corresponding data-shape constraints—for visualization within a widget.

As suggested above, in some embodiments, the widget request controller 202 receives cyclic data requests and subsequently provides datasets in response to such cyclic data requests. After each data request at reoccurring intervals—and retrieval of the datasets by the widget request controller 202 and transformation of the datasets by the data model manager 204—the widget data transmitter 206 causes the server device(s) 102 to periodically transmit transformed datasets to one of the client devices 112 in response to the periodic data requests.

As further shown in FIG. 2, the widget management system 104 includes the data storage 208. The data storage 208 optionally maintains data shapes 210 and data-shape constraints 212 (e.g., data shape and data-shape constraint definitions). In one or more embodiments, the data shapes 210 comprise a library of possible data shapes specified by the widgets 114 within various data requests. In some such embodiments, the data shapes 210 include templates that the data model manager 204 uses when transforming datasets to conform to a particular data shape specified by one of the widgets 114. Similarly, in one or more embodiments, the data-shape constraints 212 comprise a library of possible data-shape constraints specified by the widgets 114 in data requests. In some such embodiments, the data-shape constraints include templates that the data model manager 204 uses when transforming datasets to conform to particular data-shape constraints specified by one of the widgets 114.

Figure 3A:
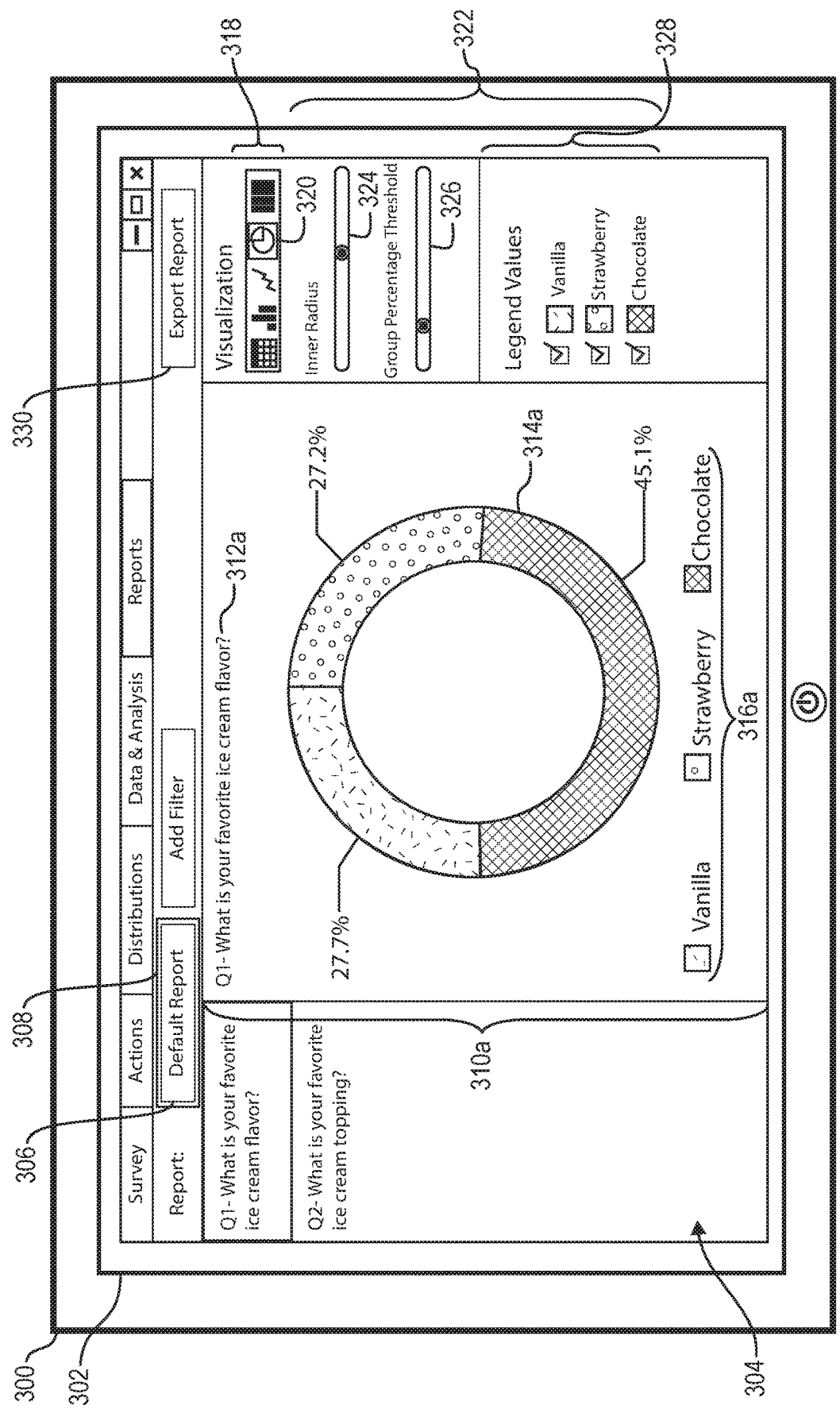
FIGS. 3A-3C illustrate multiple instances of a widget respectively interfacing with multiple software applications in accordance with one or more embodiments.
Figure 3B:
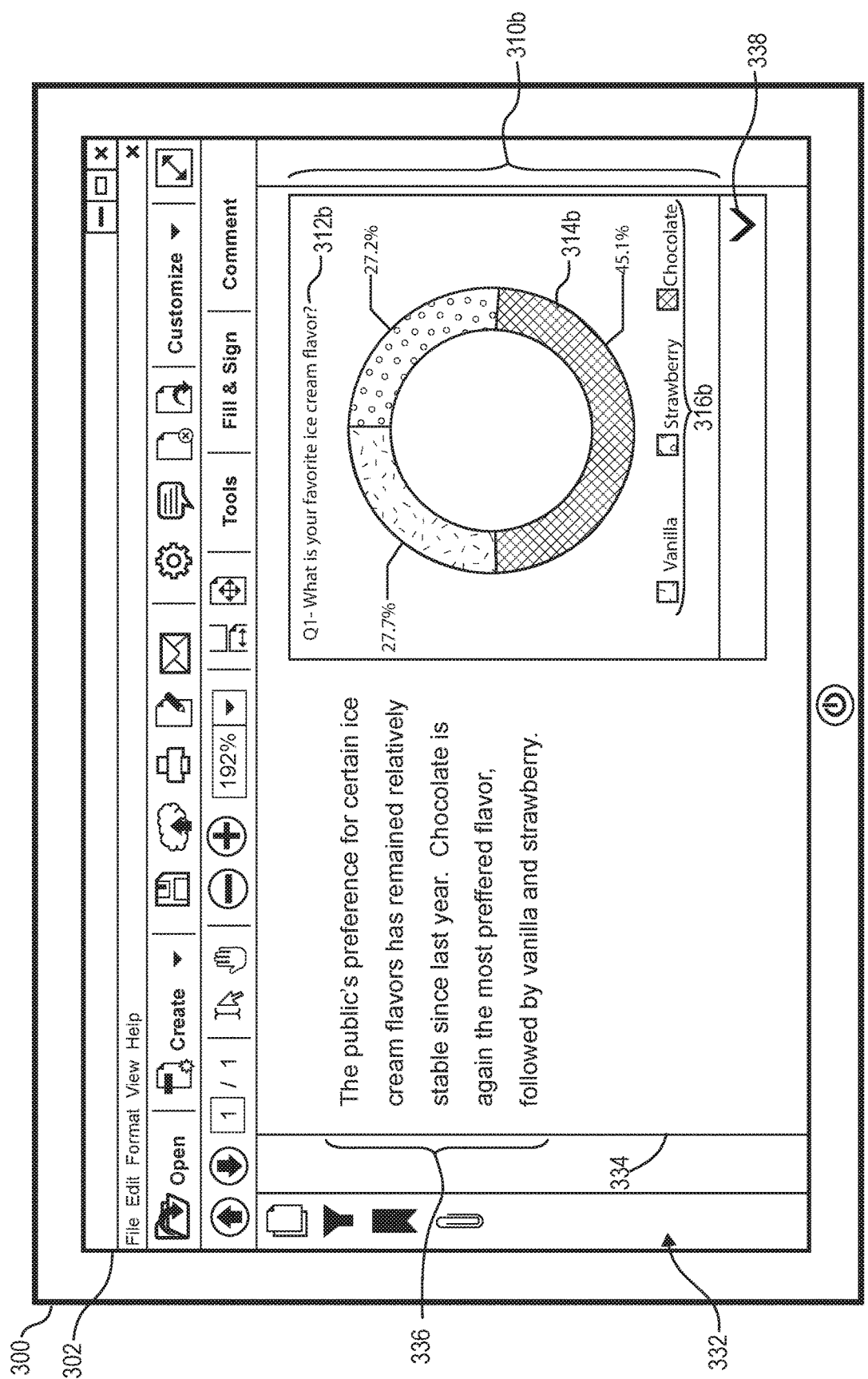
Figure 3C:
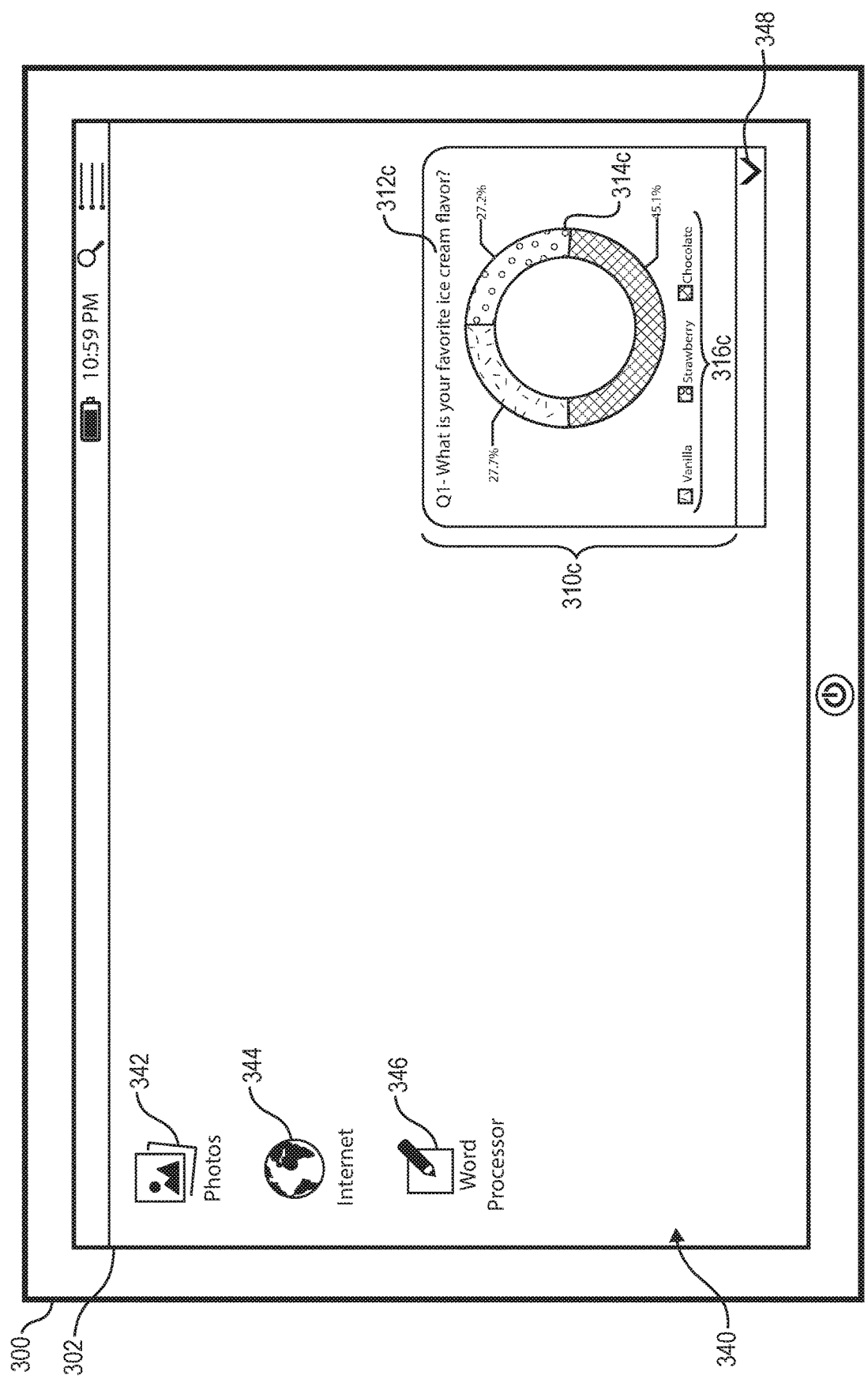

Turning now to FIGS. 3A-3C, these figures illustrate multiple instances of a widget respectively interfacing with multiple software applications. While the widget management system 104 optionally provides datasets for widgets that interface with any software application, FIGS. 3A-3C depict widgets that interface with three software applications, including a web browser, a word-processing application, and an operating system. Each of the software applications illustrated in FIGS. 3A-3C conform to a different data model associated with a different platform. Despite these different software applications, data models, and platforms, the multiple instances of the widget shown in FIGS. 3A-3C cause a client device to send data requests that call for a same data shape and corresponding data-shape constraints, as well as receive datasets for visualization within the multiple instances of the widget.

FIG. 3A illustrates a client device 300 that initializes a web browser. As shown in FIG. 3A, in addition to initializing the web browser, the client device 300 presents a web-browser graphical user interface ("GUI") 304 within a screen 302. The web-browser GUI 304 includes a survey-results report for a digital survey. A report indicator 308 surrounds a default-report option 306 to indicate that the client device 300 presents the survey-results report within the web-browser GUI 304.

As further illustrated by FIG. 3A, the web-browser GUI 304 includes a widget visualization 310a. The widget visualization 310a visualizes data for a first instance of a widget. In the embodiment shown in FIG. 3A, the first instance of the widget comprises a web widget. Specifically, the first instance of the widget comprises a chunk of code embedded within data sent from the server device(s) 102 to the client device 300. Upon receipt from the server device(s) 102, the web browser renders the chunk of code within the web-browser GUI 304. The widget visualization 310a represents the web browser's rendering of the chunk of embedded code.

As part of visualizing a dataset for a widget, such as the visualization shown in the widget visualization 310a, a widget visualization optionally includes visual subcomponents, including, but not limited to, axes, fields, numeric indicators, legends, and titles. The term "visual subcomponent" refers to a visual element that represents a dataset or a portion of a dataset for a widget. As shown in FIG. 3A, for example, the widget visualization 310a includes three visual subcomponents—a title 312a, a pie chart 314a, and a legend 316a.

A widget visualization, such as the widget visualization 310a, may also include different view models depending on a type of widget. The term "view model" refers to a model for visualizing data within a widget, including, but not limited, to view models for breakdown bars, breakdown trends, charts, gauge charts, graphs, lines, multiple source tables, scatter plots, star ratings, pie charts, and tables. In some embodiments, each such view model specifies a data shape for datasets to conform. As shown in FIG. 3A, for example, the widget visualization 310a comprises a view model for a pie chart. In some embodiments, the first instance of the widget specifies a default view model and a corresponding data shape for an initial data request. The pie-chart view model for the widget visualization 310a represents one such default view model.

In addition to default view models, in some embodiments, the widget management system 104 provides selectable options or other tools for a user to select a view model for a widget. As shown in FIG. 3A, for example, the widget management system 104 provides data that causes the client device 300 to present a view-model selector 318 within the web-browser GUI 304. As shown from left to right within the view-model selector 318, the view-model selector 318 includes selectable options for a simple table, a bar chart, a line chart, a pie chart, and a breakdown bar, each of which represent different view models. The view-model selector 318 represents each such view model with a graphical option. Upon receiving an indication of a user selection of one of these graphical options, the widget management system 104 provides a dataset that conforms to a data shape consistent with the corresponding view model.

As shown in FIG. 3A, a selector box 320 indicates that a user selects a pie-chart option as the view model for the widget visualization 310a. When the widget management system 104 receives an indication of a user selection of another option—such as a simple-table option or line-chart option—the widget management system 104 may provide a dataset that conforms to a different data shape consistent with the newly selected view model. In other words, while some view models specify a same data shape, other view models specify different data shapes.

In addition to view models and view-model selectors, in some embodiments, a widget visualization has one or more view configurations. The term "view configuration" refers to data that represents display options for visual subcomponents within a widget visualization. Such display options include, but are not limited to, options for labels, colors, orientations, numbering increments, appearance of numbers, representation of numbers (e.g., raw data counts versus percentages), and a legend appearance or position. In some embodiments, the first instance of the widget includes default view configurations for an initial data request.

In addition to any default view configurations, in some embodiments, the widget management system 104 provides selectable options or other tools for a user to select view configurations for a widget visualization. As shown in FIG. 3A, for example, the widget management system 104 provides data that causes the client device 300 to present visual-subcomponent settings 322 within the web-browser GUI 304. In this particular embodiment, the visual-subcomponent settings 322 include a radius adjuster 324, a percentage-threshold adjuster 326, and a legend menu 328. When the client device 300 detects user interactions through a mouse, stylus, touch gesture, or other interaction that selects from among the visual-subcomponent settings 322, the client device 300 provides an indication of the selection to the web browser. The web browser then renders the widget visualization 310a based on the indication of the selection. As shown in FIG. 3A, for example, the web browser renders the widget visualization 310a consistent with the selections shown within the visual-subcomponent settings 322.

While a visual-subcomponent setting may alter display options such as color or orientation, in some embodiments, a visual-subcomponent setting may also correspond to and alter a data-shape constraint. For example, in some embodiments, a visual-subcomponent setting alters a display of a widget visualization by adding a division of time or by altering a scale. When an instance of a widget receives an indication that a user selects a visual-subcomponent setting for time or scale, for example, the view configuration may change corresponding data-shape constraints to specify a time series or divisible scale, respectively. This disclosure provides an example of such a change to a visual-subcomponent setting with reference to FIGS. 4A and 4B below.

In some embodiments, the view configuration, view model, and widget visualization form a visualization component of a widget. In other words, a widget or an instance of a widget may comprise a visual component that in turn includes a view model, view configuration, and a widget visualization. In such embodiments, the visual component specifies the data shape and corresponding data-shape constraints to include within data requests. More specifically, in some embodiments, the view model specifies the data shape, and the view configuration specifies the corresponding data-shape constraints.

As suggested by FIG. 3A, the client device 300 sends a data request through the server device(s) 102 to the server device(s) 106a. For this particular embodiment, the client device 300 sends a data request for a dataset of survey results. As indicated above, the client device 300 sends a data request that calls for a data shape and corresponding data-shape constraints specified by the first instance of the widget, that is, the web widget. As shown in FIG. 3A, the client device 300 sends a data request that calls for a data shape specified by the first instance of the widget's view model and for corresponding data-shape constraints specified by the first instance of the widget's view configurations. In this embodiment, the view model specifies a data cube as the data shape and the view configuration specifies a dimension of one as one of the corresponding data-shape constraints.

After sending a data request, the client device 300 receives a dataset that conforms to the data shape and the corresponding data-shape constraints. For example, as indicated by FIG. 3A, the client device 300 receives a dataset that conforms to a data cube and a single dimension. After receiving the dataset, the client device 300 visualizes the dataset within the first instance of the widget rendered within the web browser. The widget visualization 310*a* depicts this visualization. As the client device 300 sends subsequent data requests and receives subsequent datasets, the client device 300 likewise visualizes the subsequent datasets within the first instance of the widget.

As suggested above, in some embodiments, the data shape and corresponding data-shape constraints specified by the first instance of the widget's view model and view configuration come from a default view model and a default view configuration. Alternatively, the data shape and corresponding data-shape constraints specified by the first instance of the widget's view model and view configuration come from a subsequently user-selected view model and view configuration. Regardless of whether default or subsequently user-selected view models or view configurations specify the data shape and corresponding data-shape constraints, in some embodiments, the first instance of the widget includes instructions to send cyclic data requests for updated datasets to visualize within the widget visualization 310*a*, as described above. Some such data requests optionally comprise compacted data requests, as also described above.

In one or more embodiments, the widget management system 104 enables a user to transfer (e.g., copy and paste) a widget visualization across different documents or different applications. For example, the widget management system 104 enables a user to select and copy a widget visualization rendered within a webpage by a web browser and insert the widget visualization into a word-processing document, for example. Moreover, the inserted widget visualization within the word-processing document can send data requests to retrieve updated data to visualize within the word document. In other words, the widget management system 104 provides widget visualizations that are transferable and compatible across various contexts, such as different applications.

To provide this seamless transfer of a widget visualization, in one or more embodiments, a widget visualization is visually represented within a graphical user interface as a digital image. The digital image, however, is associated with a widget file including computer code that, when executed, causes a client device to detect the context within which the widget file is operating. Based on the detected context, the computer code causes the client device to access context specific code within the widget file that generates the widget visualization within the context. For example, a widget file may comprise computer code with instructions to detect a type of computing device, operating system, and/or software application; install a software component or instance of a widget; send data requests; and/or visualize datasets.

In some embodiments, the widget file accompanies each instance of a widget visualization, for instance, as an embedded data file or metadata file. In some such embodiments, when a copy or instance of the digital image is copied, exported, moved, or otherwise transferred to a different software application, the widget file is likewise copied, exported, moved, or otherwise transferred along with the digital image. For example, the widget visualization 310*a* shown in FIG. 3A is associated with a widget file. Based on a user interaction with the widget visualization 310*a* (e.g., providing a copy command with respect to digital image of the widget visualization), a user can cause the client device 300 to transfer the widget visualization 310*a* into another context (e.g., a different application from the web browser).

FIGS. 3A and 3B illustrate an example of such a transfer. As shown in FIG. 3A, the widget visualization 310*a* comprises a digital image with an associated widget file. In this particular embodiment, metadata for the widget visualization 310*a* includes the widget file. The widget file in turn comprises computer code with instructions to detect a type of computing device, operating system, and software application; install a software component; and send data requests. As shown in FIG. 3A, in response to receiving an indication of a user selection of an export-report option 330, the widget management system 104 provides data to the client device 300 with instructions to create one of several types of widgets for various software application. Such software applications include, but are not limited to, word-processing applications, slide-show applications, spreadsheet applications, desktop applications, and mobile home-screen applications.

Although a widget file's instructions may encode for multiple types of widgets as an additional instance of the widget, the client device 300 creates only one additional instance of the widget at a time based on the widget file's instructions to detect a type of computing device, operating system, and software application. In other words, in some embodiments, the widget file's instructions specify to create an additional instance of the widget based on the detected computing device, operating system, and/or software application to which the digital image is transferred.

FIG. 3B illustrates a digital image of the widget visualization 310*a* transferred to a word-processing application. As shown in FIG. 3B, the client device 300 initializes the word-processing application. As shown in FIG. 3B, in addition to initializing the word-processing application, the client device 300 presents a word-processing GUI 332 within the screen 302. The word-processing GUI 332 further includes a digital document 334. As shown, the digital document 334 is a graphic representation of a digital file of the word-processing application. The digital document 334 itself includes a text 336 and a widget visualization 310*b*.

Similar to the widget visualization 310*a* shown in FIG. 3A, the widget visualization 310*b* shown in FIG. 3B visualizes data, but for a second instance of the widget. As shown in FIG. 3B, the second instance of the widget comprises a software component embedded within the digital document 334. When the widget file is copied into, or otherwise imported into the digital document 334, the client device 300 executes the instructions within the widget file. According to the widget file's instructions, the client device 300 detects a type of computing device and operating system of the client device 300. The client device 300 further detects a type of software application with which the second instance of the widget will interface, such as the word-processing application.

Based on the detected type of computing device, operating system, and/or software application—and the widget file's instructions—the client device 300 installs the second instance of the widget and embeds the widget visualization 310*b* within the digital document 334. Per the widget file's instructions, the client device 300 configures the second instance of the widget interface with the word-processing application. Similar to the first instance of the widget, the second instance of the widget includes the widget visualization 310*b* with three visual subcomponents—a title 312*b*, a pie chart 314*b*, and a legend 316*b*.

After installation, the second instance of the widget performs functions similar to the first instance of the widget, but while interfacing with a different software application. For example, the second instance of the widget includes a visual component that specifies a data shape and corresponding data-shape constraints to include with data requests. Per the widget file's instructions, the client device 300 also sends a data request that calls for the specified data shape and corresponding data-shape constraints.

Upon receiving a dataset that conforms to the specified data shape and corresponding data-shape constraints, the client device 300 visualizes the dataset within the second instance of the widget. The widget visualization 310b depicts this visualization. As the client device 300 sends subsequent data requests and receives subsequent datasets, the client device 300 likewise visualizes the subsequent datasets within the second instance of the widget.

As further shown in FIG. 3B, the widget visualization 310b lacks an associated view-model selector or visual-subcomponent settings. The widget visualization 310b nevertheless corresponds to a view model and a view configuration for the second instance of the widget. In some embodiments, however, the widget file includes instructions that, when executed by the client device 300, cause the client device 300 to present a view-model selector or visual-subcomponent settings within the word-processing GUI 332. As shown in FIG. 3B, for example, the digital document 334 includes a visualization arrow 338 that lies beneath the widget visualization 310b. Consistent with the widget file's instructions, upon detecting a user selection of the visualization arrow 338, the client device 300 presents a view-model selector and visual-subcomponent settings for the second instance of the widget.

In addition to providing widgets that are transferrable to a different software application through export, as shown in FIGS. 3A and 3B, the widget management system 104 also provides widgets that a computing device copies-and-pastes into a different software application or otherwise moves into a different software application. In other words, the widget management system 104 provides data to create widgets that are transferrable between different software applications.

Referring back now to FIG. 3A, as generally discussed above, the widget file includes instructions that, when executed, causes the client device 300 to copy the widget file or move the widget file itself when the client device 300 detects a user selection to copy or move the widget visualization 310a. As noted above, the widget visualization 310a comprises a digital image. Accordingly, when the client device 300 detects a user interaction that indicates copying or moving the digital image, the client device 300 copies or moves the widget file along with the widget visualization 310a. For example, FIG. 3C illustrates the client device 300 copying the first instance of the widget from the web browser and inserting it into a desktop.

As shown in FIG. 3C, the client device 300 initializes an operating system. In addition to initializing the operating system, the client device 300 presents a desktop GUI 340 within the screen 302. The desktop GUI 340 includes several software-application thumbnails, including a photo-application thumbnail 342, a web-browser thumbnail 344, and a word-processing thumbnail 346. Each of the thumbnails 342-346 represent shortcuts that, when selected, launch a corresponding software application. The desktop GUI 340 further includes a widget visualization 310c. As shown, the widget visualization 310c comprises a copy of the widget visualization 310a that the client device 300 copied from the web-browser GUI 304 and inserted into the desktop GUI 340.

As indicated by FIGS. 3A and 3C, when the client device 300 detects a user interaction that copies the widget visualization 310a from the web-browser GUI 304 and inserts it into the desktop GUI 340, the client device 300 executes instructions within the widget file. According to the widget file's instructions, the client device 300 detects a type of computing device and operating system of the client device 300. Per the widget file's instructions, the client device 300 installs a third instance of the widget and inserts the third instance of the widget into a desktop file that optionally includes software applications, software components, or other widgets for the client device 300 to execute as part of presenting the desktop GUI 340.

In the example shown in FIG. 3C, the third instance of the widget comprises a desktop widget executed by the operating system of the client device 300. Accordingly, per the widget file's instructions, the client device 300 configures the third instance of the widget to interface with the operating system. Moreover, similar to the first instance of the widget, the third instance of the widget includes the widget visualization 310c with visual subcomponents, including a title 312c, a pie chart 314c, and a legend 316c.

Additionally, in some embodiments, the widget file further includes instructions for a view-model selector and visual-subcomponent settings. Accordingly, based on the widget file's instructions, the client device 300 also presents a visualization arrow 348 within the desktop GUI 340. Consistent with the widget file's instructions, upon detecting a user selection of the visualization arrow 348, the client device 300 presents a view-model selector and visual-subcomponent settings for the third instance of the widget.

Figure 4B:
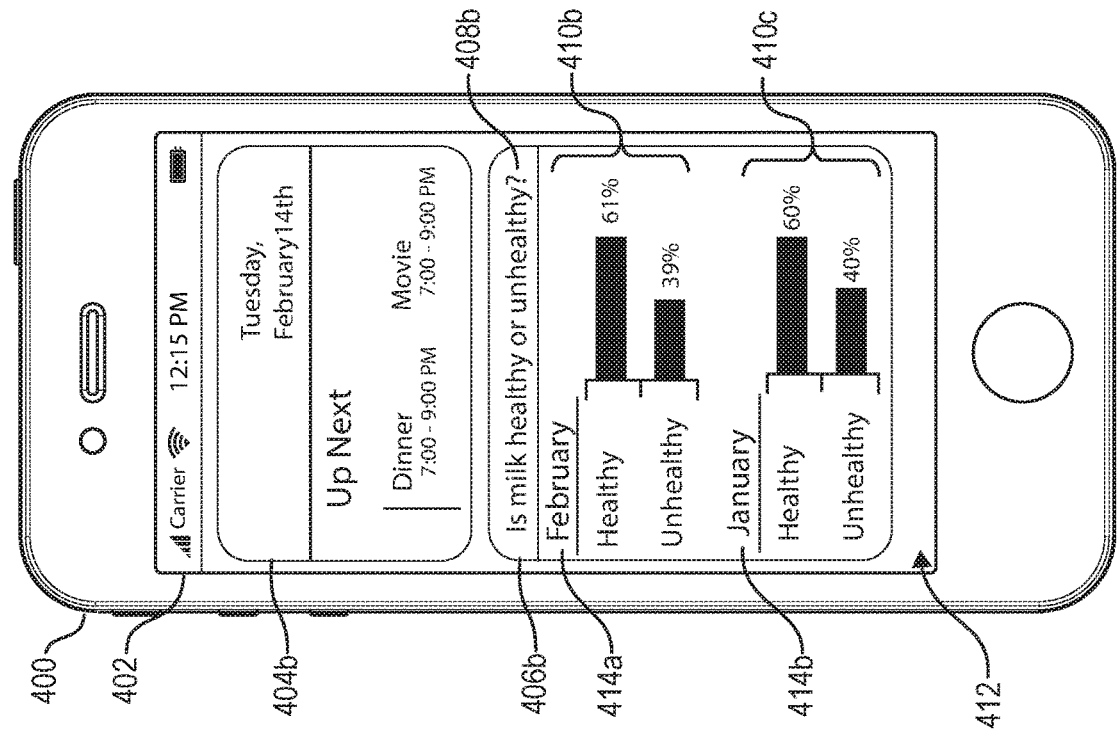
FIGS. 4A-4B illustrate multiple instances of a widget with different visualizations based on different corresponding data-shape constraints in accordance with one or more embodiments.
Figure 4A:
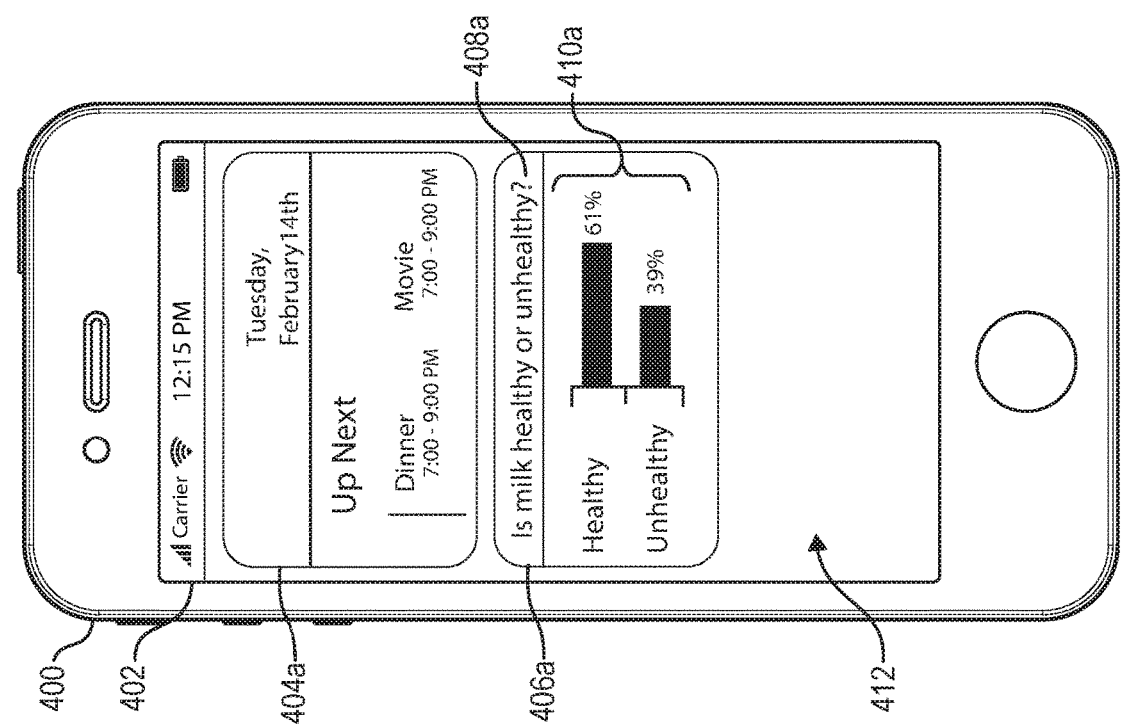

As noted above, in some embodiments, the widget management system 104 receives data requests from multiple client devices, where the data requests call for different data shapes and different corresponding data-shape constraints. FIGS. 4A and 4B illustrate multiple widgets that specify different data shapes and corresponding data-shape constraints. FIGS. 4A and 4B further illustrates an instance of a widget that sends data requests that call for a same data shape, but with different corresponding data-shape constraints. As described below, when the instance of the widget receives an indication that a user selects a different visual-subcomponent setting, the widget may instruct a client device to send an additional data request calling for an update data shape and updated data-shape constraints.

As shown in FIG. 4A, a client device 400 initializes a mobile operating system. In addition to initializing the mobile operating system, the client device 400 presents a mobile-home GUI 412 within a screen 402. The mobile-home GUI 412 includes two widget visualizations—a calendar widget visualization 404a and a survey widget visualization 406a. The calendar widget visualization 404a and the survey widget visualization 406a respectively correspond to a mobile-calendar widget and a mobile-survey widget. The widget management system 104 provides the underlying data for both mobile widgets. Moreover, per their respective widget files, both the mobile-calendar widget and the mobile-survey widget interface with the mobile operating system.

As further shown in FIG. 4A, the client device 400 sends data requests for the mobile-calendar widget and the mobile-survey widget. Each such data requests calls for different data shapes and different corresponding data-shape constraints. For example, when the client device 400 sends a data request to the server device(s) 102 for the mobile-calendar widget, the data request calls for a data shape of a simple table and corresponding data-shape constraints of two dimensions—one for a column and one for a row. Additionally, when the client device 400 sends a data request to the server device(s) 102 for the mobile-survey widget, the data request calls for a data shape of a data cube and corresponding data-shape constraints of two dimensions—one for a vertical axis and one for a horizontal axis.

Upon receiving the datasets in response to the data requests for each respective mobile widget, the client device 400 visualizes the datasets within the calendar widget visualization 404a and the survey widget visualization 406a. As shown in FIG. 4A, the calendar widget visualization 404a includes a table of upcoming appointments. Conversely, the survey widget visualization 406a includes a title 408a and a bar chart 410a. The bar chart 410a includes a visualization of certain survey results.

As FIG. 4B illustrates, however, a widget visualization may change depending on the visual-subcomponent settings and corresponding data-shape constraints. As shown in FIG. 4B, the client device 400 detects a user selection of a visual-subcomponent setting that adds a timing property to a survey widget visualization 406b. Based on the change in a visual-subcomponent setting, the mobile survey widget provides an indication to the client device 400 to send an additional data request to the server device(s) 102. In contrast to the previous data request, this subsequent data request calls for the same data shape, but for a different and additional data-shape constraint. To reflect the changed visual-subcomponent settings, the data-shape constraints include a time-series property that divides survey results by month.

Accordingly, as shown in FIG. 4B, the survey widget visualization 406b includes a title 408b and two bar charts—a bar chart 410b and a bar chart 410c. The bar chart 410b includes a representation of a dataset that corresponds to a time frame indicated by a time indicator 414a. Similarly, bar chart 410c includes a representation of a dataset that corresponds to a time frame indicated by a time indicator 414b. The survey widget visualization 406b thus represents an updated version of the survey widget visualization 406a with more particularized bar charts. By contrast, a calendar widget visualization 404b includes the same table of upcoming appointments as that shown in the calendar widget visualization 404a.

In addition to changing data-shape constraints, a change in a visual-subcomponent setting may trigger a widget to initiate a data request with a different data shape and different data-shape constraints. For example, in one such embodiment, the client device 400 detects a user selection of a visual-subcomponent setting that adds both a geographic property and a timing property to a survey widget visualization. Based on the change in a visual-subcomponent setting, the mobile survey widget provides an indication to the client device 400 to send an additional data request to the server device(s) 102. In this example, the mobile survey widget may instruct that the additional data request call for a different data shape and different data-shape constraints.

Turning now to FIG. 5, as noted above, the widget management system 104 optionally maintains a library of possible data shapes and corresponding data-shape constraints. FIG. 5 illustrates a database 500 that correlates a few such possible data shapes and corresponding data-shape constraints with view models. While the database 500 includes a few examples of such correlations, the widget management system 104 optionally includes a database with any number of correlations among view models, data shapes, and data-shape constraints. As shown, FIG. 5 includes a view-model column 502, a data-shape column 504, a data-shape-constraints column 506, an additional-requirements column 508, and a software-application column 510. In some embodiments, the server device(s) 102 maintain the database 500 as a portion of the widget management system 104.

The widget management system 104 organizes the database 500 according to view model. Specifically, each entry within the view-model column 502 includes a view model for a possible widget. Regardless of whether the widget is a desktop widget, mobile widget, web widget, or some other widget, a widget with the identified view model within the view-model column 502 corresponds to a data shape within the same row underneath the data-shape column 504 and data-shape constraints within the same row underneath the data-shape-constraints column 506. In other words, in some embodiments, widgets with the view model within the view-model column 502 typically specify a data shape and corresponding data-shape constraints within the same row and respectively underneath the data-shape column 504 and data-shape-constraints column 506. As noted above, however, visual subcomponent settings may alter corresponding data-shape constraints.

As further shown in the database 500, the additional-requirements column 508 includes some additional requirements corresponding to certain view models. For example, in certain embodiments, data requests for widgets with a view model of breakdown bar call for special data properties, such as weighting properties. As another example, in certain embodiments, data requests for widgets with a view model of gauge chart call for a domain of a field. In some embodiments, a widget file for widgets specify such additional requirements, including, but not limited to, weighting properties, time series, field domains, and time filters.

In addition to the additional-requirements column 508, the database 500 includes the software-application column 510. A widget with the identified view model within the view-model column 502 interfaces with a default software application shown in the software-application column 510. As described above, however, in certain embodiments, the widget management system 104 includes a widget file with each instance of a widget that includes instructions that enable the widget to interface with multiple software applications.

Figure 6:
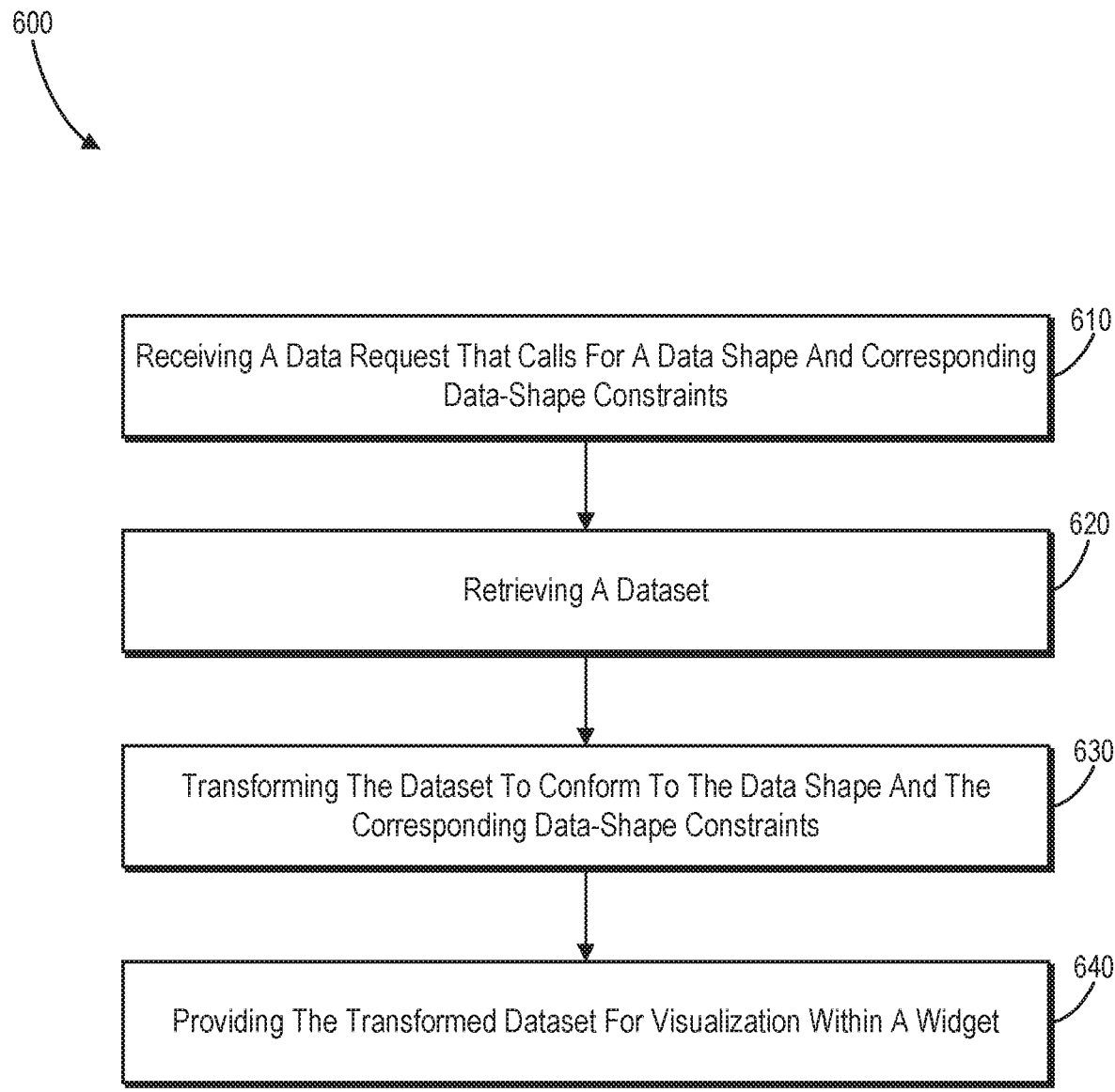
FIG. 6 illustrates a flowchart of a series of acts in a method of retrieving and transforming a requested dataset into a data shape specified by a widget in accordance with one or more embodiments.

Turning now to FIG. 6, this figure illustrates a flowchart of a series of acts in a method 600 of retrieving and transforming a requested dataset into a data shape specified by a widget in accordance with one or more embodiments. While FIG. 6 illustrates acts according to one embodiment, alternative embodiments may omit, add to, reorder, and/or modify any of the acts shown in FIG. 6.

As shown in FIG. 6, the method 600 includes an act 610 of receiving a data request that calls for a data shape and corresponding data-shape constraints. In particular, act 610 includes receiving, from a client device, a data request that calls for a data shape and corresponding data-shape constraints specified by a widget. For example, in some embodiments, receiving the data request comprises receiving, from the client device, the data request that calls for the data shape and the corresponding data-shape constraints specified by a visualization component of the widget. In some such embodiments, the visualization component comprises a view model, a view configuration, and a visualization.

Similarly, in some embodiments, receiving the data request comprises receiving, from the client device, a data packet that comprises authentication information that complies with an authentication protocol, an identification of a user, a request for the dataset, and a specification of the data shape and the corresponding data-shape constraints.

As further shown in FIG. 6, the method 600 includes an act 620 of retrieving a dataset. In particular, act 620 includes, based on the data request, retrieving a dataset having a data structure corresponding to a data model, the data model associated with a platform.

As further shown in FIG. 6, the method 600 includes an act 630 of transforming the dataset to conform to the data shape and the corresponding data-shape constraints. In particular, act 630 includes transforming the dataset from the data structure to conform to the data shape and the corresponding data-shape constraints.

As further shown in FIG. 6, the method 600 includes an act 640 of providing the transformed dataset for visualization within a widget. In particular, act 640 includes providing the transformed dataset to the client device for visualization within the widget. For example, in some embodiments, providing the transformed dataset to the client device for visualization within the widget comprises providing the transformed dataset as a data stream to the client device for visualization within the widget.

Additionally, in some embodiments, the method 600 further includes receiving, from the client device, an additional data request that calls for the data shape and additional corresponding data-shape constraints, the data shape and the additional corresponding data-shape constraints specified by an additional instance of the widget; based on the additional data request, retrieving an additional dataset having an additional data structure corresponding to an additional data model, the additional data model associated with an additional platform; transforming the additional dataset from the additional data structure to conform to the data shape and the additional corresponding data-shape constraints; and providing the transformed additional dataset to the client device for visualization within the additional instance of the widget. In some such embodiments, the additional dataset comprises an additional instance of the dataset.

Relatedly, in some embodiments, receiving the data request comprises receiving, from the client device executing a first software application, the data request that calls for the data shape and the corresponding data-shape constraints specified by the widget interfacing with the first software application; and receiving the additional data request comprises receiving, from the client device executing a second software application, the additional data request that calls for the additional data shape and the additional corresponding data-shape constraints specified by the additional instance of the widget interfacing with the second software application.

Similarly, in some embodiments, receiving the data request comprises receiving, from the client device executing a first software application, the data request that calls for the data shape and the corresponding data-shape constraints specified by the widget interfacing with the first software application; and receiving the additional data request comprises receiving, from the client device executing a second software application, the additional data request that calls for the data shape and the corresponding data-shape constraints specified by the additional instance of the widget interfacing with the second software application.

Alternatively, in some embodiments, the method 600 further includes receiving, from the client device, periodic data requests at reoccurring intervals that call for the data shape and the corresponding data-shape constraints specified by the widget; based on the periodic data requests, retrieving datasets having the data structure corresponding to the data model, the data model associated with the platform; transforming the datasets from the data structure to conform to the data shape and the corresponding data-shape constraints; and periodically providing the transformed datasets to the client device for visualization within the widget in response to the periodic data requests.

Additionally, in some embodiments, the method 600 further comprises receiving, from the client device executing a third software application, another data request that calls for the data shape and the corresponding data-shape constraints specified by the widget interfacing with the third software application. Relatedly, in some embodiments, the method 600 further comprises receiving, from an additional client device, another data request that calls for a different data shape and different corresponding data-shape constraints specified by an additional widget; based on the other data request, transform another dataset having another data structure corresponding to another data model to conform to the different data shape and the different corresponding data-shape constraints, the other data model associated with another platform; and providing the transformed other dataset to the additional client device for visualization within the additional widget.

Conversely, the method 600 further includes receiving, from an additional client device, an additional data request specified by an additional widget, the data request calling for neither data shape nor corresponding data-shape constraints; retrieving an additional dataset having the data structure corresponding to the data model, the data model associated with the platform; and providing the additional dataset to the additional client device for visualization within the additional widget based on the additional data request calling for neither data shape nor corresponding data-shape constraints. In some such embodiments, the additional widget comprises a standard version of the widget.

Figure 7:
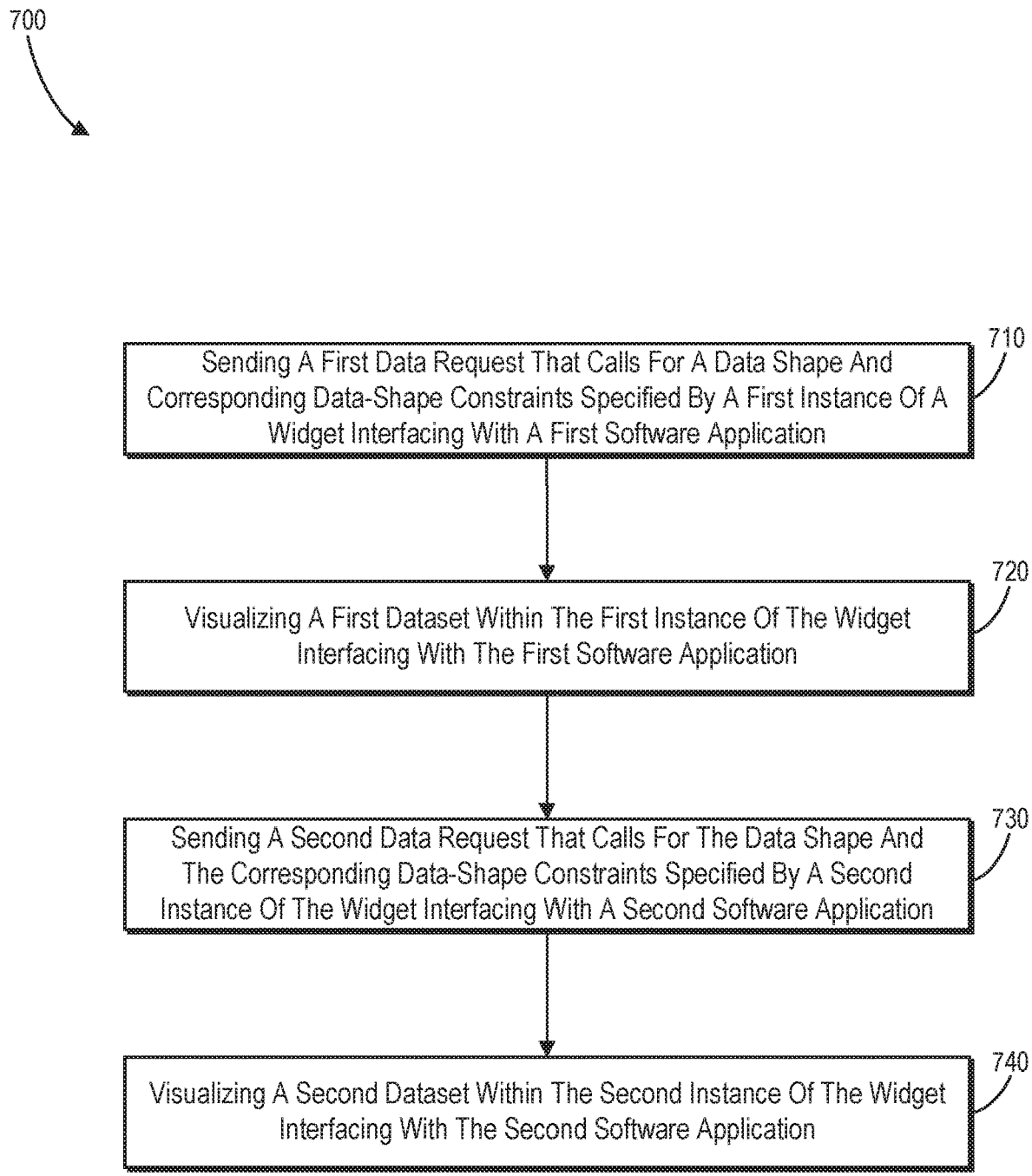
FIG. 7 illustrates a flowchart of a series of acts in a method of requesting and receiving datasets that conform to a data shape and corresponding data-shape constraints specified by a widget in accordance with one or more embodiments.

Turning now to FIG. 7, this figure illustrates a flowchart of a series of acts in a method 700 of requesting and receiving datasets that conform to a data shape and corresponding data-shape constraints specified by a widget in accordance with one or more embodiments. While FIG. 7 illustrates acts according to one embodiment, alternative embodiments may omit, add to, reorder, and/or modify any of the acts shown in FIG. 7.

As shown in FIG. 7, the method 700 includes an act 710 of sending a first data request that calls for a data shape and corresponding data-shape constraints specified by a first instance of a widget interfacing with a first software application. In particular, in some embodiments, act 710 includes sending a first data request that calls for a data shape and corresponding data-shape constraints specified by a first instance of a widget, the first instance of the widget interfacing with a first software application.

For example, in some embodiments, sending the first data request comprises sending a first data packet that comprises authentication information that complies with an authentication protocol, an identification of a user, a first request for the first dataset, and a specification of the data shape and the corresponding data-shape constraints. In some such embodiments, the specification of the data shape and the corresponding data-shape constraints further comprises one or more of a weighting property, a time series, a field domain, and a time filter. As another example, in some embodiments, sending the first data request comprises sending the first data request that calls for a data shape comprising a multi-dimensional array of values and the corresponding data-shape constraints identifying a number of dimensions.

As further shown in FIG. 7, the method 700 includes an act 720 of visualizing a first dataset within the first instance of the widget interfacing with the first software application. In particular, act 720 includes, in response to receiving a first dataset that conforms to the data shape and the corresponding data-shape constraints, visualizing the first dataset within the first instance of the widget interfacing with the first software application.

As further shown in FIG. 7, the method 700 includes an act 730 of sending a second data request that calls for the data shape and the corresponding data-shape constraints specified by a second instance of the widget interfacing with a second software application. In particular, act 730 includes sending a second data request that calls for the data shape and the corresponding data-shape constraints specified by a second instance of a widget, the second instance of the widget interfacing with a second software application. In some embodiments, the first and the second software applications utilize a platform. Conversely, in other embodiments, the first software application utilizes a first platform and the second software application utilizes a second platform.

Additionally, in some embodiments, sending the second data request comprises sending a second data packet that comprises the authentication information that complies with the authentication protocol, the identification of the user, a second request for the second dataset, and the specification of the data shape and the corresponding data-shape constraints. In some such embodiments, the specification of the data shape and the corresponding data-shape constraints further comprises one or more of a weighting property, a time series, a field domain, and a time filter. As another example, in some embodiments, sending the second data request comprises sending the second data request that calls for the data shape comprising the multi-dimensional array of values and the corresponding data-shape constraints identifying a different number of dimensions.

As further shown in FIG. 7, the method 700 includes an act 740 of visualizing a second dataset within the second instance of the widget interfacing with the second software application. In particular, act 740 includes, in response to receiving a second dataset that conforms to the data shape and the corresponding data-shape constraints, visualizing the second dataset within the second instance of the widget interfacing with the second software application.

Figure 8:
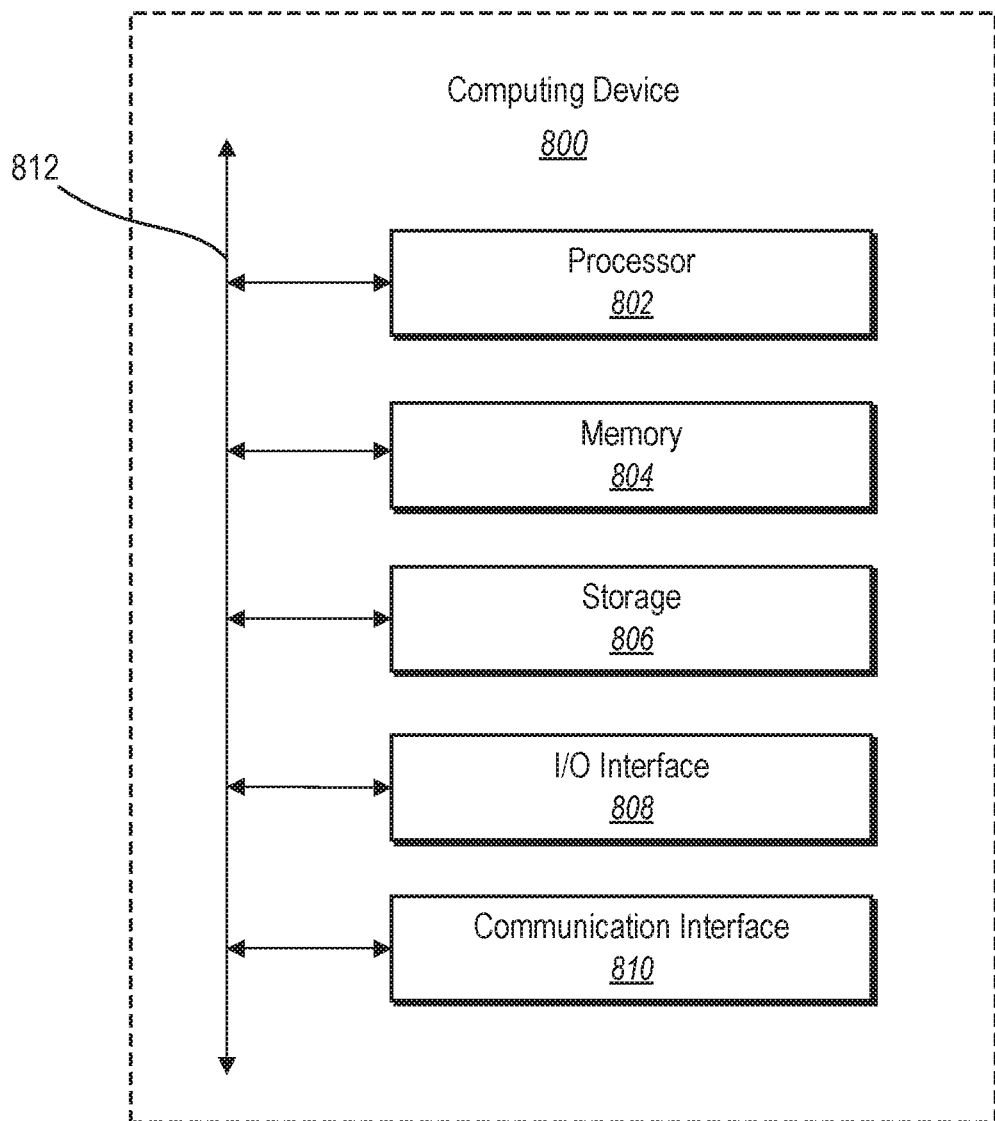
FIG. 8 illustrates a block diagram of a computing device in accordance with one or more embodiments.

FIG. 8 illustrates a block diagram of an exemplary computing device 800 that may be configured to perform one or more of the processes described above. One will appreciate that one or more computing devices such as the computing device 800 may implement the server device(s) 102 and 106 and/or other devices described above in connection with FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. While the exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers ("TLBs"). Instructions in the instruction caches may be copies of instructions in the memory 804 or the storage device 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, the storage device 806 can comprise a non-transitory computer readable storage medium storing instructions. The storage device 806 may include a hard disk drive ("HDD"), a floppy disk drive, flash memory, an optical disc, a magneto-optical disc, magnetic tape, or a Universal Serial Bus ("USB") drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 808 allows a user to provide input to, receive output from, and otherwise transfer data to and receive data from the computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 810 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 810 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 9:
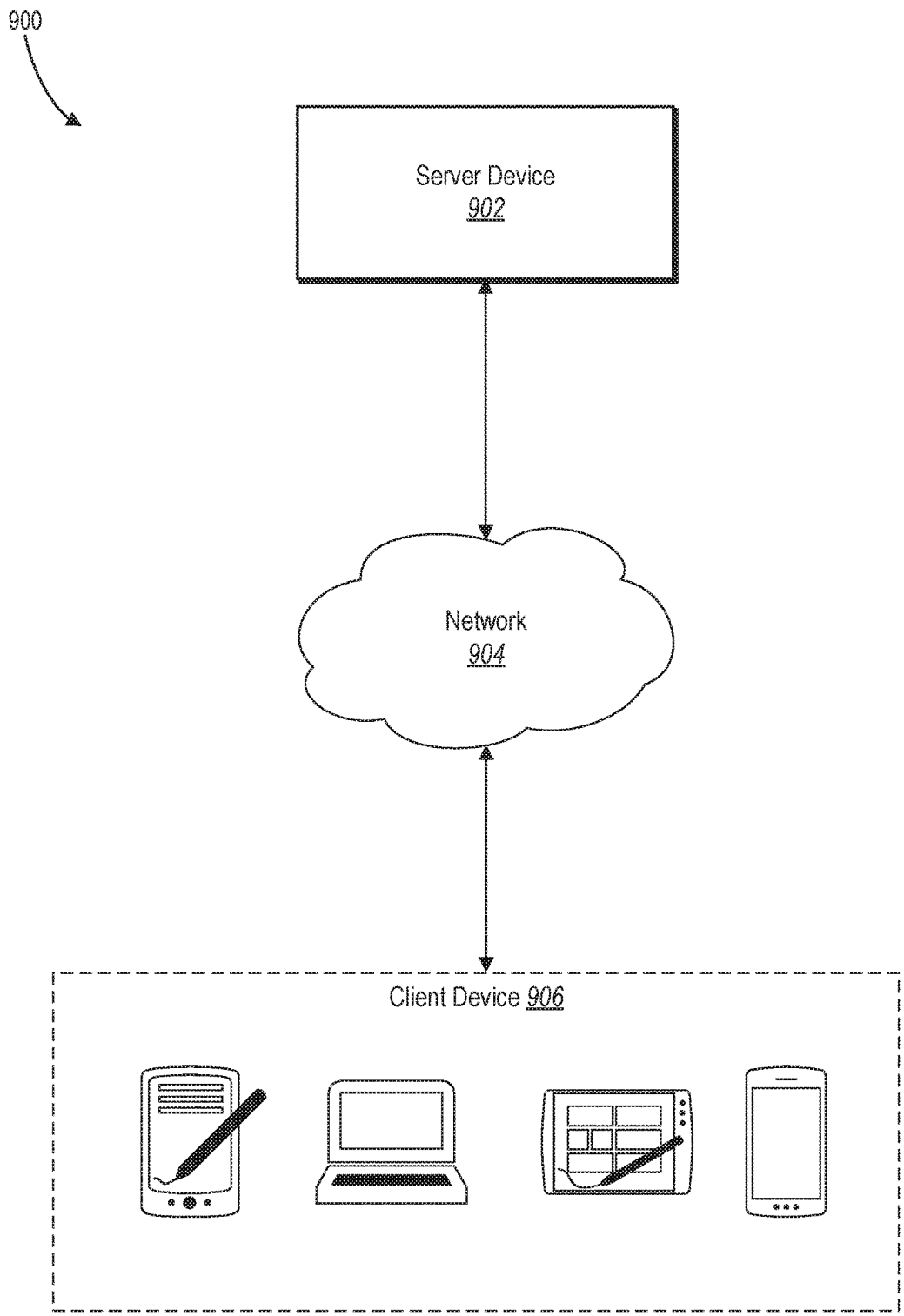
FIG. 9 illustrates a networking environment of a widget management system in accordance with one or more embodiments.

FIG. 9 illustrates an example network environment 900 of the widget management system 104. Network environment 900 includes a client device 906, and a server device 902 connected to each other by a network 904. Although FIG. 9 illustrates a particular arrangement of client device 906, server device 902, and network 904, this disclosure contemplates any suitable arrangement of client device 906, server device 902, and network 904. As an example and not by way of limitation, two or more of client device 906, and server device 902 may be connected to each other directly, bypassing network 904. As another example, two or more of client device 906 and server device 902 may be physically or logically co-located with each other in whole, or in part. Moreover, although FIG. 9 illustrates a particular number of client devices 906, server devices 902, and networks 904, this disclosure contemplates any suitable number of client devices 906, server devices 902, and networks 904. As an example and not by way of limitation, network environment 900 may include multiple client devices 906, server devices 902, and networks 904.

This disclosure contemplates any suitable network 904. As an example and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906, and server device 902 to communication network 904 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client device 906 may be an electronic device including hardware, software, or embedded logic components or a combination of two or more such components and capable of carrying out the appropriate functionalities implemented or supported by client device 906. As an example and not by way of limitation, a client device 906 may include any of the computing devices discussed above in relation to FIG. 9. A client device 906 may enable a network user at client device 906 to access network 904.

In particular embodiments, client device 906 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 906 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client device 906 one or more Hyper Text Markup Language ("HTML") files responsive to the HTTP request. Client device 906 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 902 may include a variety of servers, sub-systems, programs, modules, logs, and data stores. In particular embodiments, server device 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 902 may also include suitable components such as network interfaces, security mechanisms, load balancers, failover servers, management-and-network-operations consoles, other suitable components, or any suitable combination thereof.

In particular embodiments, server device 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., users 116a and 116n, customers, etc.).

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   providing, by a server device to a client device, an initial visualization of data for a recurring visualization within a widget stored on the client device;
   receiving, by the server device from the client device, an instance of a cyclic data request that calls for:
      updated data to visualize as a graphic representation within the widget to update the recurring visualization within the widget; and
      a first data shape as a first data-storage structure for organizing data in a storage device, the first data shape specified by the widget, defined by a first set of multiple dimensions, and corresponding to a first data model specific to a first platform;
   based on the instance of the cyclic data request, retrieving, by the server device for visualization within the widget, a dataset having a second data shape as a second data-storage structure for organizing data in the storage device, the second data shape defined by a second set of multiple dimensions and corresponding to a second data model specific to a second platform, the second data model incompatible with the first data model by the second data model not recognizing data conforming to the first data model;
   transforming, by the server device, the dataset from the second data shape as the second data-storage structure to conform to the first data shape specified by the widget as the first data-storage structure in part by increasing or decreasing a number of dimensions for the dataset in a change from the second set of multiple dimensions defining the second data shape to the first set of multiple dimensions defining the first data shape; and
   providing, by the server device to the client device, the transformed dataset for the client device to transition from the initial visualization to an updated visualization while maintaining a same display orientation by presenting the transformed dataset as the graphic representation within the widget.

2. The method of claim 1, further comprising:
   receiving an indication of a user selecting a visual-subcomponent setting for the recurring visualization; and
   modifying a display orientation of the updated visualization from the same display orientation to a different display orientation based on the user selecting the visual-subcomponent setting.

3. The method of claim 1, wherein the second data model not recognizing data conforming to the first data model comprises the second data model using data shapes as data-storage structures for organizing data that are unrecognized by the first data model.

4. The method of claim 1, wherein increasing or decreasing the number of dimensions for the dataset comprises increasing or decreasing a number of axes for organizing data in the change from the second set of multiple dimensions defining the second data shape to the first set of multiple dimensions defining the first data shape.

5. The method of claim 1, wherein a visualization component of the widget specifies the first data shape and the visualization component comprises a view configuration for the same display orientation.

6. The method of claim 1, wherein the instance of the cyclic data request is one of a plurality of periodic data requests received at reoccurring intervals.

7. The method of claim 1, wherein receiving the instance of the cyclic data request comprises receiving, from the client device storing the widget, a data packet comprising authentication information that complies with an authentication protocol, an identification of a user, a request for the dataset, and a specification of the first data shape as the first data-storage structure for organizing data.

8. The method of claim 1, further comprising:
   receiving, by the server device from an additional client device storing an additional widget, a data request for additional data to visualize as an additional graphic representation within the additional widget, the data request calling for neither data shape nor corresponding data-shape constraints specified by the additional widget;
   retrieving, by the server device for visualization within the additional widget, an additional dataset having the second data shape defined by the second set of multiple dimensions; and
   providing, by the server device to the additional client device, the additional dataset for the additional client device to transition from an additional initial visualization to an additional updated visualization by presenting the additional graphic representation within the additional widget based on the data request calling for neither data shape nor corresponding data-shape constraints.

9. The method of claim 1, wherein the second set of multiple dimensions comprises more dimensions than the first set of multiple dimensions.

10. A non-transitory computer readable storage medium storing instructions that, when executed by at least one processor, cause a computer system to:
send a first data request of a first set of cyclic data requests calling for a data shape as a data-storage structure for organizing data in a storage device, the data shape specified by a first instance of a widget and defined by a first set of multiple dimensions, and the first instance of the widget interfacing with a first software application corresponding to a first data model;
in response to receiving a first dataset that conforms to the data shape, visualize the first dataset as a first graphic representation within the first instance of the widget to update a first recurring visualization while maintaining a same display orientation;
send a second data request of a second set of cyclic data requests calling for the data shape as the data-storage structure for organizing data in the storage device, the data shape specified by a second instance of the widget and defined by a second set of multiple dimensions, and the second instance of the widget interfacing with a second software application corresponding to a second data model, the second data model incompatible with the first data model by the second data model not recognizing data conforming to the first data model, and the second set of multiple dimensions differing from the first set of multiple dimensions; and
in response to receiving a second dataset that conforms to the data shape, visualize the second dataset as a second graphic representation within the second instance of the widget to update a second recurring visualization while maintaining a same additional display orientation.

11. The non-transitory computer readable storage medium of claim 10, wherein
the second data model not recognizing data conforming to the first data model comprises the second data model using a different software language or a different machine-language code than the first data model.

12. The non-transitory computer readable storage medium of claim 11, wherein the first software application utilizes a first platform and the second software application utilizes a second platform differing from the first platform.

13. The non-transitory computer readable storage medium of claim 10, further comprising instructions that, when executed by the at least one processor, cause the computer system to:
send the first data request of the first set of cyclic data requests by sending a first data packet comprising authentication information that complies with an authentication protocol, an identification of a user, a first request for the first dataset, and a specification of the data shape as the data-storage structure for organizing data in the storage device; and
send the second data request of the second set of cyclic data requests by sending a second data packet comprising the authentication information that complies with the authentication protocol, the identification of the user, a second request for the second dataset, and the specification of the data shape as the data-storage structure for organizing data in the storage device.

14. The non-transitory computer readable storage medium of claim 13, wherein the specification of the data shape as the data-storage structure for organizing data further comprises one or more of a weighting property, a time series, a field domain, and a time filter.

15. The non-transitory computer readable storage medium of claim 10, further comprising instructions that, when executed by the at least one processor, cause the computer system to:
send the first data request of the first set of cyclic data requests by sending the first data request of the first set of cyclic data requests calling for a particular data shape comprising a multi-dimensional array of values in accordance with the first set of multiple dimensions and identifying the first set of multiple dimensions as a data-shape constraint for the particular data shape; and
send the second data request of the second set of cyclic data requests by sending the second data request of the first set of cyclic data requests calling for the particular data shape comprising the multi-dimensional array of values and identifying the second set of multiple dimensions as a different data-shape constraint for the particular data shape.

16. A system comprising:
at least one processor; and
at least one non-transitory computer readable storage medium storing instructions that, when executed by the at least one processor, cause the system to:
provide, to a client device, an initial visualization of data for a recurring visualization within an instance of a widget stored on the client device;
receive, from the client device, a data request of a set of cyclic data requests calling for:
updated data to visualize as a graphic representation within the instance of the widget to update a recurring visualization within the instance of the widget; and
a first data shape as a first data-storage structure for organizing data in a storage device, the first data shape specified by the instance of the widget and defined by a first set of multiple dimensions;
based on the instance of the cyclic data request, retrieve, for visualization within the instance of the widget, a dataset having a second data shape as a second data-storage structure for organizing data in the storage device, the second data shape defined by a second set of multiple dimensions and incompatible with the instance of the widget by the instance of the widget not recognizing the second data shape;
transform the dataset from the second data shape as the second data-storage structure to conform to the first data shape specified by the instance of the widget as the first data-storage structure in part by increasing or decreasing a number of dimensions for the dataset in a change from the second set of multiple dimensions defining the second data shape to the first set of multiple dimensions defining the first data shape; and
provide the transformed dataset to the client device for client device to transition from the initial visualization to an updated visualization while maintaining a same display orientation by presenting the transformed dataset as the graphic representation within the instance of the widget.

17. The system of claim 16, further comprising instructions that, when executed by the at least one processor, cause the system to:
- receive, from the client device, an additional data request of an additional set of cyclic data requests calling for:
  - additional data to visualize as an additional graphic representation within an additional instance of the widget to update an additional recurring visualization within the additional instance of the widget; and
  - the first data shape as the first data-storage structure for organizing data in the storage device, the first data shape specified by the additional instance of the widget and defined by the first set of multiple dimensions;
- based on the additional data request, transform an additional dataset having a third data shape as a third data-storage structure for organizing data in the storage device to conform to the first data shape as the first data-storage structure for organizing data in the storage device; and
- provide the transformed additional dataset to the client device for the client device to transition from an additional initial visualization to an additional updated visualization by presenting the transformed additional dataset as the additional graphic representation within the additional instance of the widget.

18. The system of claim 17, further comprising instructions that, when executed by the at least one processor, cause the system to:
- receive, from the client device executing a first software application, the data request of the set of cyclic data requests calling for the first data shape specified by the instance of the widget interfacing with the first software application; and
- receive, from the client device executing a second software application, the additional data request of the additional set of cyclic data requests calling for the first data shape specified by the additional instance of the widget interfacing with the second software application.

19. The system of claim 16, further comprising instructions that, when executed by the at least one processor, cause the system to receive, from the client device, the data request of the set of cyclic data requests calling for the first data shape by further receiving a request for a set of labels or filters as a further data-shape constraint for the first data shape.

20. The system of claim 16, wherein the instance of the widget not recognizing the second data shape comprises the instance of the widget not visualizing graphic representations data organized in the second data shape.

* * * * *